(12) United States Patent
Akaike et al.

(10) Patent No.: US 10,795,608 B2
(45) Date of Patent: Oct. 6, 2020

(54) COMPUTER, COMMUNICATION DRIVER, AND COMMUNICATION CONTROL METHOD

(71) Applicant: HITACHI, LTD., Tokyo (JP)

(72) Inventors: Hirotoshi Akaike, Tokyo (JP); Kentaro Shimada, Tokyo (JP); Kazushi Nakagawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 224 days.

(21) Appl. No.: 15/761,117

(22) PCT Filed: Feb. 19, 2016

(86) PCT No.: PCT/JP2016/054803
§ 371 (c)(1),
(2) Date: Mar. 19, 2018

(87) PCT Pub. No.: WO2017/141413
PCT Pub. Date: Aug. 24, 2017

(65) Prior Publication Data
US 2018/0285021 A1 Oct. 4, 2018

(51) Int. Cl.
*G06F 3/06* (2006.01)
*G06F 13/10* (2006.01)
*G06F 9/54* (2006.01)

(52) U.S. Cl.
CPC .......... *G06F 3/0659* (2013.01); *G06F 3/0611* (2013.01); *G06F 3/0613* (2013.01);
(Continued)

(58) Field of Classification Search
None
See application file for complete search history.

(56) References Cited

U.S. PATENT DOCUMENTS

2002/0199038 A1  12/2002  Mamiya et al.
2011/0173353 A1*  7/2011  Bauman .............. G06F 9/45558
                                                         710/28
(Continued)

FOREIGN PATENT DOCUMENTS

JP    2003-006135 A    1/2003
JP    2013-541766 A   11/2013

OTHER PUBLICATIONS

International Search Report of PCT/JP2016/054803 dated Apr. 19, 2016.

*Primary Examiner* — Chat C Do
*Assistant Examiner* — William C Wood
(74) *Attorney, Agent, or Firm* — Mattingly & Malur, PC

(57) ABSTRACT

A memory stores: a communication driver that is a software program which runs in an operating system and communicates with a host; and a storage service program that is a software program which runs on the operating system and controls retention of data by a storage apparatus as a storage. The processor is capable of configuring a plurality of queue pairs which transmit information in inter-process communication between the communication driver and the storage service program, and the processor further configures command distribution information which associates a queue pair and a logical volume with each other, specifies a queue pair corresponding to a logical volume that is an access destination of a command requested by the host, and enqueues a command request of the command to the specified queue pair.

11 Claims, 19 Drawing Sheets

(52) U.S. Cl.
CPC .......... *G06F 3/0629* (2013.01); *G06F 3/0656* (2013.01); *G06F 3/0661* (2013.01); *G06F 3/0689* (2013.01); *G06F 9/546* (2013.01); *G06F 13/10* (2013.01)

(56) References Cited

U.S. PATENT DOCUMENTS

2012/0066435 A1    3/2012  Colgrove et al.
2012/0210337 A1    8/2012  Cardona et al.

\* cited by examiner

| Storage port ID (611) | LU number (612) | OQ acceptable waiting time (613) | Acceptable queue load (614) |
|---|---|---|---|
| 0 | 0 | 50 | 1 |
| 0 | 1 | 50 | 1 |
| 0 | 2 | 50 | 5 |
| 0 | 3 | 50 | 5 |
| 0 | 4 | 300 | 10 |
| 0 | 5 | 300 | 10 |
| 0 | 6 | 300 | 10 |
| 0 | 7 | 50 | 5 |
| ... | | | |

COMPUTER, COMMUNICATION DRIVER, AND COMMUNICATION CONTROL METHOD

TECHNICAL FIELD

The present invention relates to software-defined storage.

BACKGROUND ART

In software-defined storage which has been gaining popularity in recent years, inter-process communication is sometimes used. In inter-process communication, a communication system which transmits and receives information via queues for information communication is known. PTL 1 discloses a method of improving communication performance by providing multiple queues of a network adapter device.

CITATION LIST

Patent Literature

[PTL 1]
US2012/0210337 "Resource Affinity Via Dynamic Reconfiguration for Multi-Queue Network Adapters"

SUMMARY OF INVENTION

Technical Problem

A general storage apparatus using dedicated hardware includes a randomly accessible non-volatile storage medium and a storage controller which controls data transfer between a host computer coupled to the storage apparatus and the non-volatile storage medium inside the storage apparatus. Examples of the randomly accessible non-volatile storage medium include a magnetic disk drive, a non-volatile semiconductor memory drive, and an optical disk drive.

In addition, currently mainstream storage apparatuses are provided with a plurality of hard disk drives (HDD) and/or flash drives. A storage apparatus including a flash drive is superior to a storage apparatus only including a hard disk drive in terms of lifetime, power saving, access time, and the like. The storage controller includes a frontend interface for coupling a host computer, a processor for controlling a storage apparatus and a memory coupled to the processor, a plurality of drives as storage media, a switch for coupling the processor and the frontend interface, and the like.

Meanwhile, in recent years, software-defined storage which is constituted by computer hardware similar to that of a general-purpose server and which provides functions similar to those of a storage apparatus using dedicated hardware is becoming popular. A software-defined storage executes processing similar to a storage controller in a storage apparatus using dedicated hardware as described above by means of software (hereinafter, referred to as "storage software"). Storage software includes a storage service program and a target driver.

The storage service program runs in a user space on system software (an Operating System, hereinafter referred to as an "OS") running on a general-purpose server, and provides a storage function. In recent years, performance of general-purpose servers has improved in association with an increase in the number of processor cores mounted thereto and, consequently, processing performance of storage service programs has also improved.

The target driver runs in a kernel space of the OS and is coupled to the software service program in the user space to provide a storage target function. The storage target function is a function that enables communication with a host such as receiving a command request that requests a command to be executed from the host and transmitting a command completion response that indicates completion of the command requested by the command request to the host.

The storage service program and the target driver mutually transmit and receive various kinds of information including a command request and a command completion response through inter-process communication. As described earlier, in recent years, processing performance of storage service programs have improved in association with improved performance of general-purpose servers. However, on the other hand, there is a problem in that the inter-process communication between the storage service program and the target driver becomes a bottleneck and prevents performance of the storage service program from being fully utilized.

In consideration thereof, there is the technique disclosed in PTL 1 which improves communication performance by providing multiple queues. However, the technique according to PTL 1 is characteristically not suitable for software-defined storage.

When there are a plurality of queues and communication frames are distributed to the plurality of queues, an order in which the communication frames are dequeued and processed may change depending on a state of congestion of queues to which the communication frames are input. For example, when a queue to which is input a communication frame input later has more available space than a queue to which is input a communication frame input earlier, there is a possibility that the order of communication frames may change.

In a storage system, an inconvenience may occur if an order of communication frames changes and a processing order of commands changes. However, a storage protocol used by the storage system for communication does not have a function for restoring an order of commands. Therefore, although it is required that an order of commands to be processed be separately guaranteed in order to prevent logical inconsistency in data processing, malfunctions such as data loss caused by the logical inconsistency, and the like, the technique according to PTL 1 does not guarantee an order of communication frames.

An object of the present invention is to improve processing performance while guaranteeing a processing order of commands in a storage system which performs inter-process communication.

Solution to Problem

A computer according to an embodiment of the present invention includes: a storage apparatus configured to writably and readably store data; a memory configured to store a software program; and a processor configured to execute the software program.

The memory is configured to store: a communication driver that is a software program configured to run in an operating system and communicate with a host; and a storage service program that is a software program configured to run on the operating system and control retention of data by the storage apparatus as a storage.

The processor is configured to execute the communication driver and the storage service program, the processor is capable of configuring a plurality of queue pairs including a queue in each of both directions which transmits information in inter-process communication between the communication driver and the storage service program, and the processor is further configured to: configure command distribution information which associates the queue pair and a logical volume with each other; specify a queue pair corresponding to a logical volume that is an access destination of a command requested by the host by referring to the command distribution information; and enqueue a command request of the command to the specified queue pair.

Advantageous Effects of Invention

According to the present invention, processing performance can be improved while guaranteeing a processing order of commands in a storage system which performs inter-process communication.

BRIEF DESCRIPTION OF DRAWINGS

FIG. 6 represents an entry format example of an inbound queue 225 according to the first embodiment.

FIG. 7 represents an entry format example of an outbound queue 226 according to the first embodiment.

FIG. 15 is a diagram showing a queue addition/reduction determination table 227 stored in the processor main memory of the storage apparatus 100 according to the second embodiment.

DESCRIPTION OF EMBODIMENTS

Hereinafter, several embodiments will be described with reference to the drawings. It should be noted that the embodiments described below are not intended to limit the invention as set forth in the accompanying claims and that all of the respective elements and combinations thereof described in the embodiments are not necessarily essential to solutions proposed by the invention.

Although a variety of information will be described below using expressions such as an "XX table", the variety of information can be expressed by data structures other than a table. An "XX table" can be referred to as "XX information" in order to demonstrate that the variety of information is not dependent on data structure.

In the following description, while a software program is sometimes used as a subject when describing processing, since a software program causes processing to be performed by being executed by hardware itself or by a processor (for example, an MP (Micro Processor)) included in the hardware, hardware or a processor may be used as a subject of processing. A software program may be provided from a storage apparatus, a program distribution server, a storage medium, or the like.

First Embodiment

In the first embodiment, a basic embodiment of a storage apparatus which performs command distribution to a plurality of queues will be described.

A flow of description with respect to the first embodiment is as follows.

First, a configuration of a storage apparatus according to the first embodiment will be described with reference to FIGS. 1 and 2. Next, contents of tables used in control and formats of queue entries will be described with reference to FIGS. 3 to 7A and 7B. Next, command processing and a queue management process of a communication driver of a storage according to the first embodiment will be described with reference to FIGS. 8 to 11. Note that a target driver which provides a storage target function will be hereinafter referred to as a communication driver.

First, an overall configuration of a computer system according to the first embodiment will be described with reference to FIGS. 1 and 2.

Figure 1:
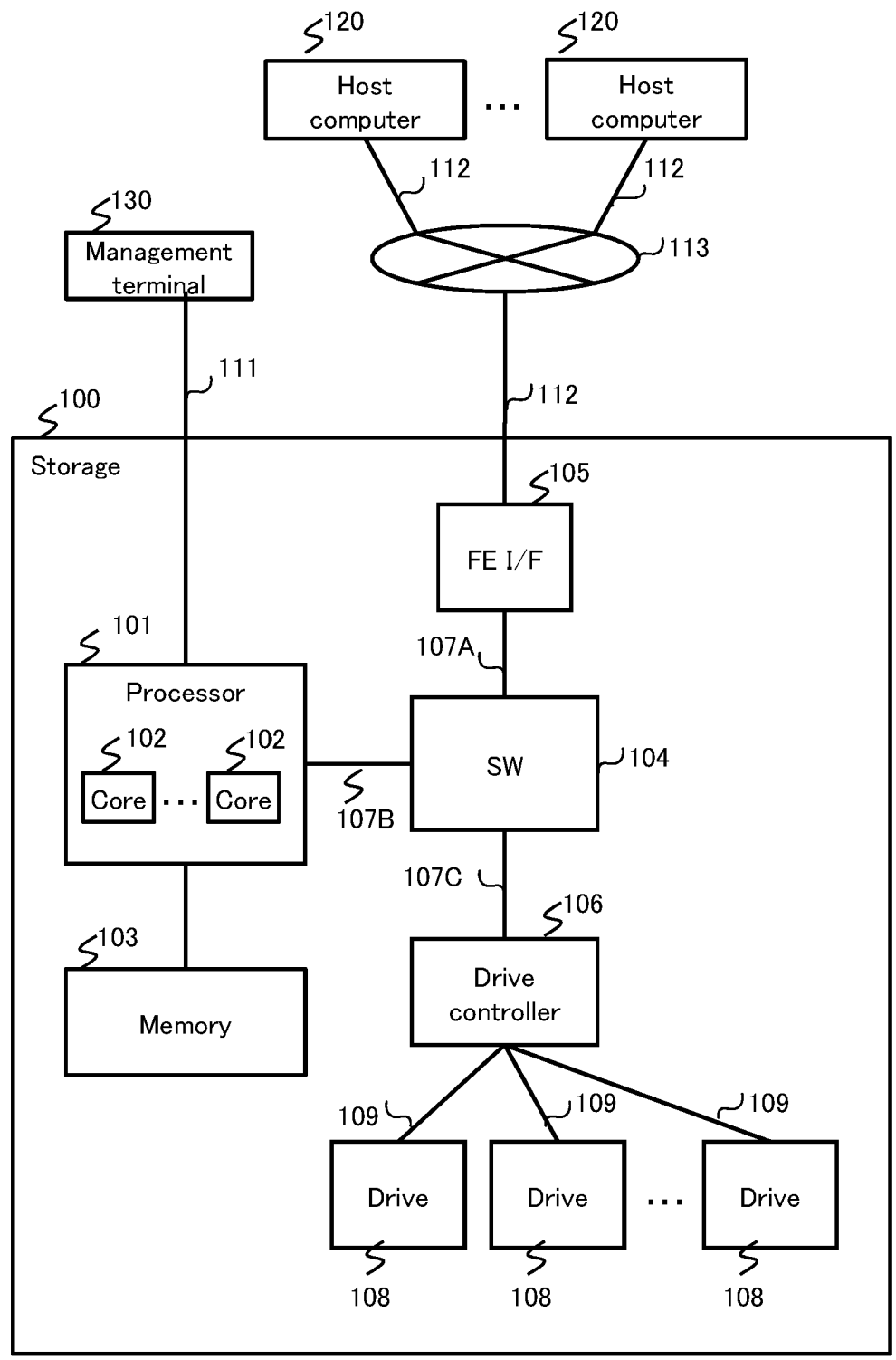
FIG. 1 is a block diagram showing a configuration of a storage apparatus 100 and a periphery thereof according to a first embodiment.

FIG. 1 is a block diagram showing a configuration of a storage apparatus 100 and a periphery thereof according to a first embodiment. A management terminal 130 is coupled to the storage apparatus 100, and a host computer 120 is coupled to the storage apparatus 100 via a network 113. Alternatively, instead of being directly coupled to the storage apparatus 100, the management terminal 130 may be coupled to the storage apparatus 100 via the network 113 or another network.

The storage apparatus 100 includes a frontend interface (FE I/F) 105, a processor 101, a memory 103, a switch 104, a drive controller 106, and a drive 108.

The memory 103 is a main storage of the processor 101 and includes: programs to be executed by the processor 101; management tables to be referred to by the processor 101; and a data cache area in which data is to be temporarily stored. Details of the contents of the memory 103 will be described later with reference to FIG. 3.

The frontend interface 105 is coupled to the host computer 120 via a signal line 112 and the network 113. In addition, the frontend interface 105 performs protocol conversion between a data transfer protocol between the host computer 120 and the storage apparatus 100 and a data transfer protocol in the storage apparatus 100. Specific examples of the frontend interface 105 include a Host Bus Adaptor (HBA), a Host Channel Adaptor (HCA), and an NIC (Network Interface Card).

The switch 104 is coupled to the frontend interface 105 via a signal line 107A, coupled to the processor 101 via a signal line 107B, and coupled to the drive controller 106 via a signal line 107C. The signal lines 107A to 107C are, for example, PCI Express buses used as internal data transfer paths of a storage apparatus.

The management terminal 130 is coupled to the storage apparatus 100 via a signal line 111. The management terminal 130 includes: an input apparatus to be used by a manager of the storage apparatus 100 to input configuration information to the storage apparatus 100; and a display apparatus for displaying information regarding the storage apparatus 100 to the manager.

The drive controller 106 is coupled to the drive 108 via a signal line 109. The drive controller 106 performs drive control and, at the same time, performs protocol conversion between a data transfer protocol between the processor 101 and the drive controller 106 and a drive control protocol. Alternatively, the drive controller 106 and the drive 108 may be coupled to each other via a network constituted by switches. When the drive 108 is a drive that can be coupled to a PCI Express bus, the drive controller 106 need not be provided, in which case the drive 108 is coupled to a processor 140 or the switch 104 via a PCI Express bus.

Figure 2:
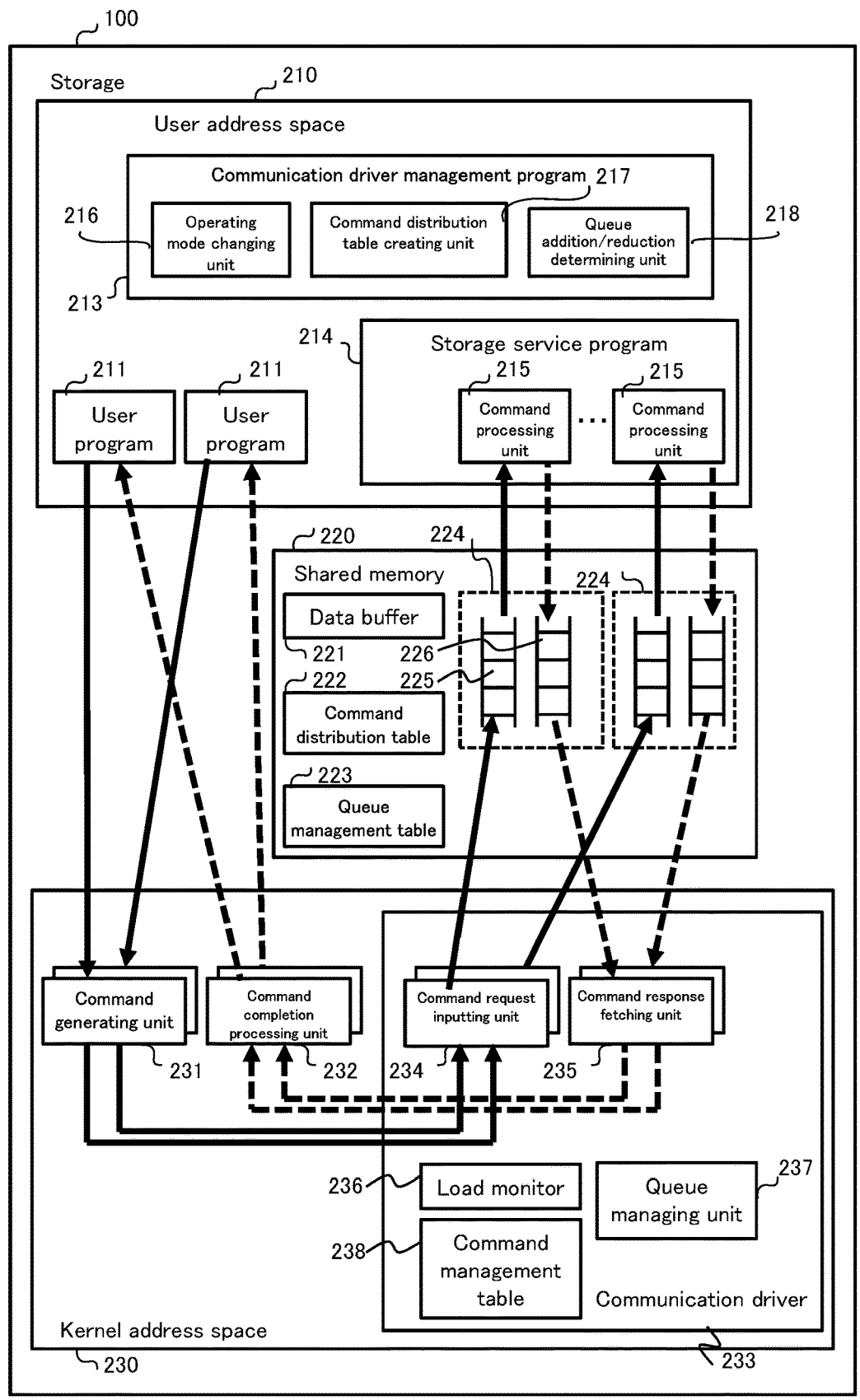
FIG. 2 is a block diagram showing a configuration of a storage apparatus according to the first embodiment.

FIG. 2 is a block diagram showing a configuration of a storage apparatus according to the first embodiment.

An operating system (OS, not illustrated) runs on the storage apparatus 100. The OS includes a user address space 210 in which a user program runs and a kernel address space 230 in which a kernel runs. A program running in the user address space of the OS will be referred to as a program running on the OS, and a program running in the kernel address space of the OS will be referred to as a program running in the OS. A shared memory 220 is a memory space to be used by a user program running on the OS and a communication driver 233 running in the OS to transmit and receive information by inter-process communication.

An instance of a user program 211, an instance of a communication driver management program 213, and an instance of a storage service program 214 which provides a storage function run in the user address space 210. The communication driver management program 213 includes: an operating mode changing unit 216 which changes operating modes in a fetching operation of an entry from an outbound queue 226; and a command distribution table creating unit 217 which creates a command distribution table 222. The storage service program 214 includes one or more command processing units 215 which process storage commands. Moreover, the storage service program 214 is not limited to the mode described above in which the storage service program 214 is arranged inside the storage apparatus 100 and may be a program which runs on a virtualized server.

The shared memory 220 includes a data buffer 221, the command distribution table 222, a queue management table 223, and one or more queue pairs 224. A queue pair 224 includes: an inbound queue 225 for communicating control data from the communication driver 233 to the storage service program 214; and the outbound queue 226 for communicating control data from the storage service program 214 to the communication driver 233. A request and a completion response of one command are transmitted using the inbound queue 225 and the outbound queue 226 of a same queue pair.

The kernel address space 230 includes: one or more command generating units 231 which generate a command in accordance with an instruction from the user program 211; one or more command completion processing units 232 which notify the user program 211 of a command completion; and the communication driver 233 which communicates with the storage service program 214. The communication driver 233 includes one or more command request inputting units 234, one or more command response fetching units 235, a load monitor 236, a queue managing unit 237, and a command management table 238. The command management table 238 is a table which temporarily stores information on a command received by the communication driver 233 until processing of the command is completed.

Communication using the queue pair 224 between the storage service program 214 and the communication driver 233 will now be described using an example of a command request for requesting execution of a command and a command response for notifying completion of the command.

First, communication of a command request will be described.

The command request inputting unit 234 analyzes a command generated by the command generating unit 231 and selects one inbound queue from contents of the command.

A plurality of queue pairs 224 including queues 225 and 226 in each of both directions which transmit information in inter-process communication between the communication driver 233 and the storage service program 214 can be configured. At this point, the command request inputting unit 234: configures the command distribution table 222 which associates a queue pair and a logical volume with each other; specifies a queue pair corresponding to a logical volume that is an access destination of a command requested by the host by referring to the command distribution table 222; and enqueues a command request of the command to the specified queue pair. A more detailed queue selection method will be described later.

Next, the command request inputting unit 234 inputs (also referred to as "enqueues") the command as a queue entry to the end of the selected inbound queue 225. For example, the command processing unit 215 monitors the inbound queue 225 and, when there is an entry newly input to the inbound queue 225, fetches (also referred to as "dequeues") a queue entry from the top of the inbound queue 225.

Next, a command completion response will be described. After completion of command processing, the command processing unit 215 selects one outbound queue 226 from contents of the command. A selection method will be described later. Next, the command processing unit 215 inputs a command completion response as a queue entry to the end of the selected outbound queue 226. For example, the command response fetching unit 235 monitors the outbound queue 226 and, when there is an entry newly input to the outbound queue 226, fetches a queue entry from the top of the outbound queue 226.

As described above, in the present embodiment, processing performance can be improved by providing multiple queues and, focusing on the fact that access destinations of commands of which a processing order is to be maintained are located inside a same logical volume, distributing commands having a same logical volume as access destinations to same queue pair enables the processing order of commands to be maintained.

Figure 3:
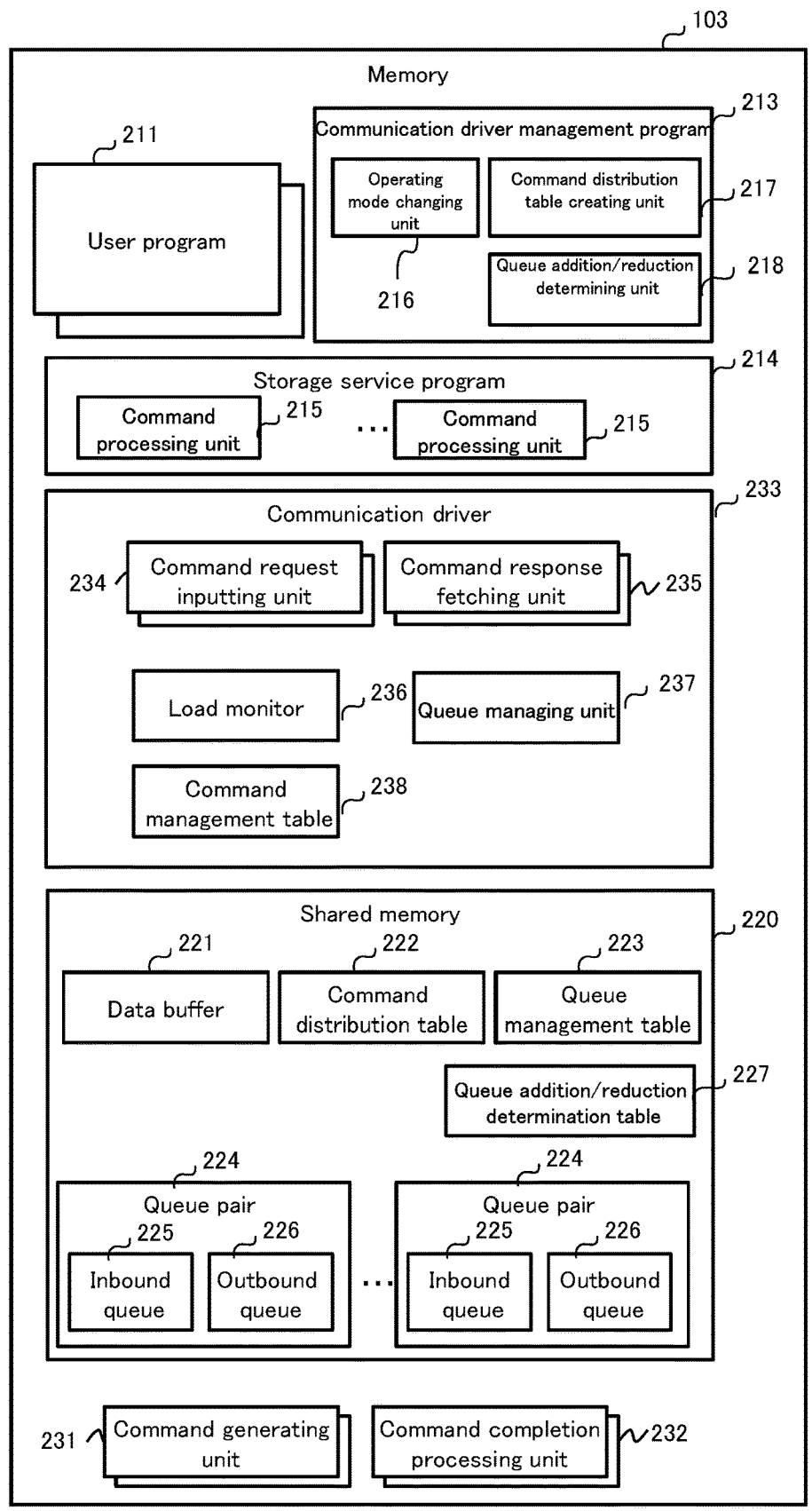
FIG. 3 is a diagram showing information stored in a processor main memory of the storage apparatus 100 according to the first embodiment.

FIG. 3 is a diagram showing information stored in a processor main memory of the storage apparatus 100 according to the first embodiment. Note that FIG. 3 only illustrates information related to the communication driver 233 and, for example, does not illustrate a cache area used by the storage service program 214 and the like.

The memory 103 stores the user program 211, the communication driver management program 213, the storage service program 214, the communication driver 233, the shared memory 220, the command generating unit 231, and the command completion processing unit 232. As already shown in FIG. 2, the communication driver management program 213 includes the operating mode changing unit 216 and the command distribution table creating unit 217. As already shown in FIG. 2, the storage service program 214 includes one or more command processing units 215. As already shown in FIG. 2, the communication driver 233 includes one or more command request inputting units 234, one or more command response fetching units 235, the load monitor 236, the queue managing unit 237, and the command management table 238.

As already shown in FIG. 2, the shared memory 220 includes the data buffer 221, the command distribution table 222, the queue management table 223, and one or more queue pairs 224. As already shown in FIG. 2, the queue pair 224 includes the inbound queue 225 and the outbound queue 226.

Figure 4:
FIG. 4 is a diagram showing a configuration of a queue management table stored in the processor main memory of the storage apparatus 100 according to the first embodiment.

FIG. 4 is a diagram showing a configuration of a queue management table stored in the processor main memory of the storage apparatus 100 according to the first embodiment.

The queue management table 223 is a table in which management information with respect to each queue pair is recorded. With respect to each queue pair, the queue management table 223 records a queue pair ID 401, a queue pair state 402, an inbound queue (hereinafter, referred to as an "IQ") queue index 403, an outbound queue (hereinafter, referred to as an "OQ") queue index 404, an operating mode 407, and a CPU utilization rate 408.

The queue pair state 402 includes "in operation" which indicates that the queue pair is in operation and "stop" which indicates that the queue pair has stopped.

The IQ queue index 403 includes a Producer-Index (PI) and a Consumer-Index (CI). The OQ queue index 404 similarly includes a Producer-Index (PI) and a Consumer-Index (CI). The PI is an index indicating a queue entry to be enqueued next and the CI is an index indicating a queue entry to be dequeued next.

The operating mode 407 indicates an operating mode of the command response fetching unit 235 corresponding to a queue pair. Operating modes of the fetching unit 235 include a "system call" mode and a "polling" mode. The "system call" mode and the "polling" mode will be described later.

The CPU utilization rate 408 indicates a CPU utilization rate of the command response fetching unit 235 corresponding to the queue pair. The CPU utilization rate of the command response fetching unit 235 is obtained through, for example, monitoring performed by the load monitor 236 provided in the communication driver 233. The communication driver 233 regularly updates the CPU utilization rate based on a value obtained by the load monitor 236. As another example, a relationship between a frequency at which I/O commands are input to a queue pair in the past and the CPU utilization rate may be accumulated as statistical information, an estimated value of the CPU utilization rate at present may be calculated based on the statistical information and a frequency at which I/O commands are input to a queue pair at present, and the CPU utilization rate may be substituted by the estimated value.

Figure 5:
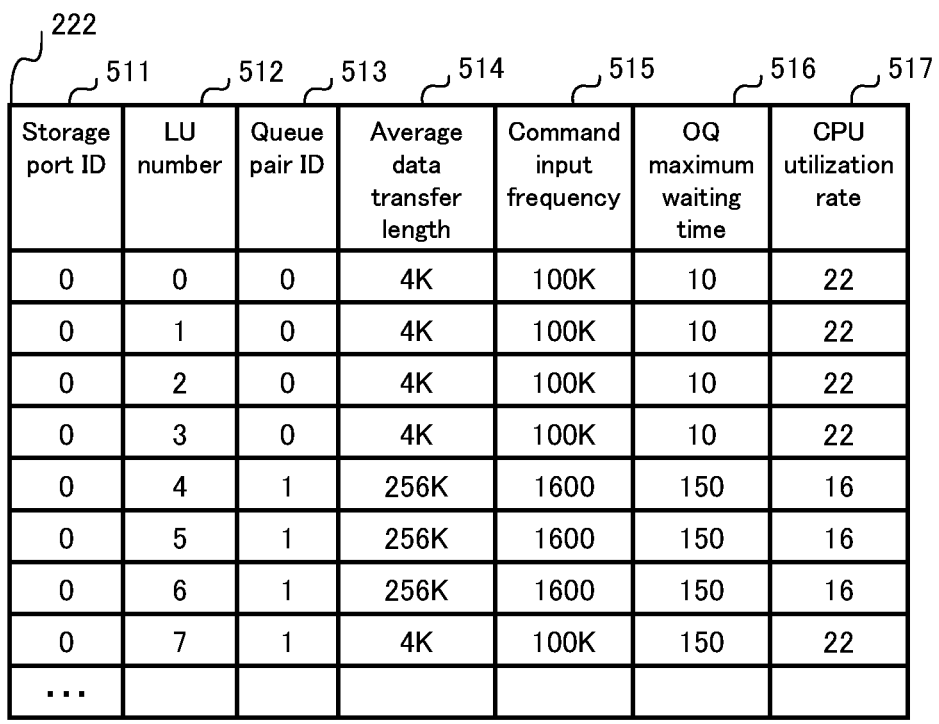
FIG. 5 is a diagram showing a configuration of a command distribution table 222 stored in the processor main memory of the storage apparatus 100 according to the first embodiment.

FIG. 5 is a diagram showing a configuration of the command distribution table 222 stored in the processor main memory of the storage apparatus 100 according to the first embodiment. The command distribution table 222 is a table which associates a logical volume that is an access destination of a command requested from a host and a queue pair to which the command is enqueued with each other. By referring to the command distribution table 222, a queue pair corresponding to a logical volume that is an access destination of a command requested from a host can be specified.

The command distribution table 222 is used to select a command distribution destination queue pair, change a command distribution destination queue pair, and determine the change. The command distribution table 222 can be referred to from the storage service program 214 and the communication driver 233.

In command distribution, a queue pair that is a command distribution destination is determined such that a command is distributed to a same queue pair in units of a logical volume which is an access destination of each command. The command distribution table 222 according to the present embodiment includes mapping information of a logical volume that is an access destination of a command and a queue pair to be a command distribution destination as well as load information related to performance of the queue pair.

A logical volume is uniquely determined from a pair of a storage port ID 511 which identifies a storage port and an LU number 512 which indicates a logical unit. A storage port refers to an interface used in communication between a host and a storage. Among storage ports, a host-side port is referred to as a host port and a storage-side port is referred to as a storage port.

Although the present embodiment does not adopt a configuration in which a host and a storage are coupled via network because a host and a storage exist in a same apparatus, the user program corresponding to a host side and the storage service program corresponding to a storage side communicate with each other via virtual ports. A virtual port is given a unique ID in order to distinguish a transmission source from a transmission destination. In this case, one or a plurality of each of a virtual host port and a virtual storage port may be provided.

As shown in FIG. 5, specifically, the command distribution table 222 records the storage port ID 511, the LU number 512, a queue pair ID 513, an average data transfer length 514, a command input frequency 515, an OQ maximum waiting time 516, and a CPU utilization rate 517.

The queue pair ID 513 is an ID which is uniquely allocated to each queue pair and which is a serial value starting with zero. The average data transfer length 514 indicates an average value of a data transfer length per one command with respect to commands which pass through the queue pair indicated by the queue pair ID 513. The command input frequency 515 indicates the number of times a command is input during a certain set period or, in other words, a frequency of command input. The OQ maximum waiting time 516 indicates a maximum value of the time required from the command processing unit 215 inputting a queue entry to an end of an OQ to the command response fetching unit 235 fetching the queue entry from a top of the OQ during a certain set period or, in other words, a maximum waiting time. The CPU utilization rate 517 indicates a CPU utilization rate of processing by the command response fetching unit 235 related to the logical volume. A method of acquiring the CPU utilization rate is as described earlier. The average data transfer length 514 represents an I/O pattern and the command input frequency 515, the OQ maximum waiting time 516, and the CPU utilization rate 517 represent I/O load amounts. For example, values of the load amounts are acquired by the load monitor 236 which is provided in the communication driver 233 and which monitors a CPU utilization rate, and the communication driver 233 regularly updates the load amounts with the obtained values.

Figure 6A:
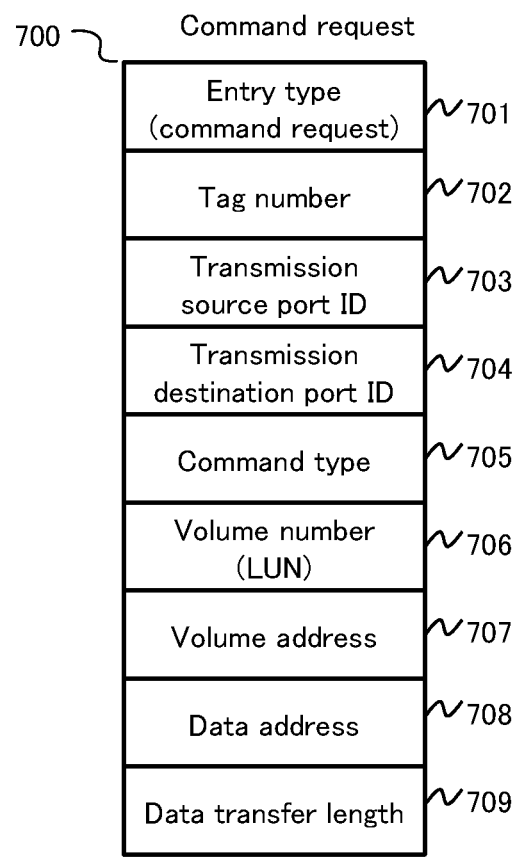
FIG. 6A represents a format of an entry of a command request.
Figure 6B:
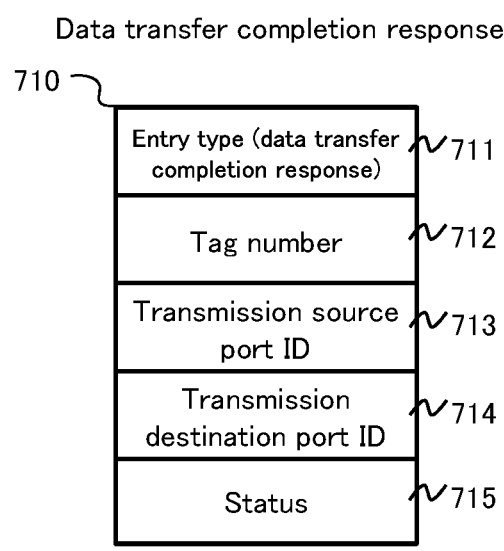
FIG. 6B represents a format of an entry of a data transfer completion response.

FIGS. 6A and 6B represent an entry format example of the inbound queue 225 according to the first embodiment. FIG. 6A represents a format of an entry of a command request, and FIG. 6B represents a format of an entry of a data transfer completion response. The inbound queue 225 has two types of entries, namely, a command request 700 shown in FIG. 6A and a data transfer completion response 710 shown in FIG. 6B.

The command request 700 includes an entry type 701 which indicates a "command request", a tag number 702 which identifies a command, a port ID 703 of a command transmission source, a port ID 704 of a command transmission destination, a command type 705, a volume number (LUN) 706 of a command processing target, a volume address 707 of a command processing target address, a data address 708 of a host-side data buffer, and a data transfer length 709.

Examples of the command type 705 include a management command request with respect to the storage service program. 214 in addition to a read request and a write request (hereafter, these two requests will be collectively referred to as an I/O request). Examples of a management command include a command for configuring a configuration or a parameter and a command for acquiring configuration information or parameter information.

The data transfer completion response 710 includes an entry type 711 indicating a "data transfer completion response", a tag number 712 which associates a data transfer request (to be described later with reference to FIG. 7A) and the present data transfer completion response with each other, a port ID 713 of a transmission source, a port ID 714 of a transmission destination, and a status 715 which includes information such as a result regarding whether data transfer succeeded or failed.

Figure 7A:
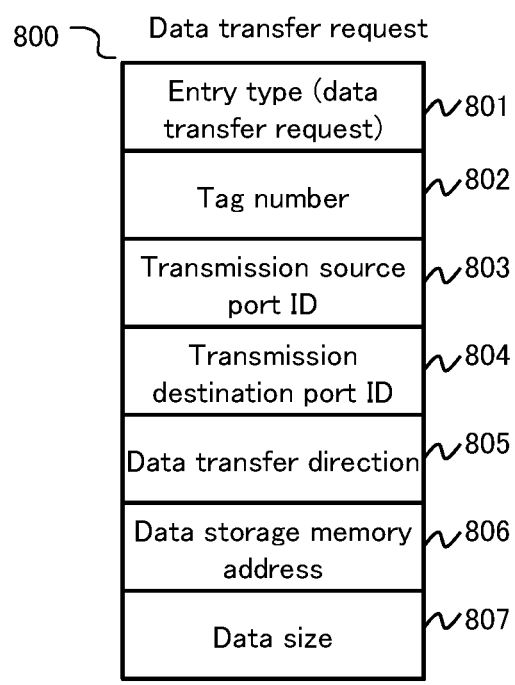
FIG. 7A represents a format of an entry of a data transfer request.
Figure 7B:
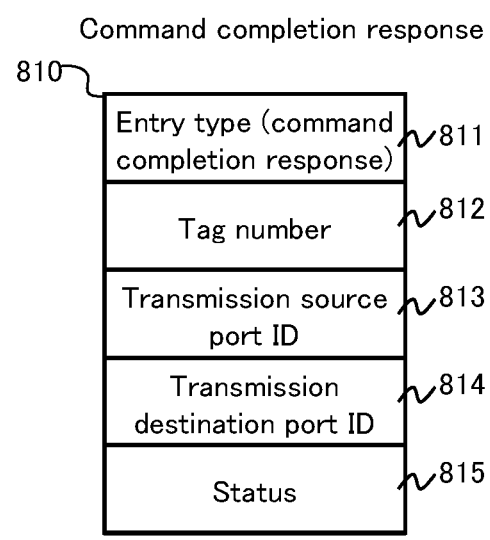
FIG. 7B represents a format of an entry of a command completion response.

FIGS. 7A and 7B represent an entry format example of the outbound queue 226 according to the first embodiment. FIG. 7A represents a format of an entry of a data transfer request, and FIG. 7B represents a format of an entry of a command completion response. The outbound queue 226 has two types of entries, namely, a data transfer request 800 shown in FIG. 7A and a command completion response 810 shown in FIG. 7B.

The data transfer request 800 includes an entry type 801 indicating a "data transfer request", a tag number 802 which identifies a data transfer request, a port ID 803 of a transmission source, a port ID 804 of a transmission destination, a data transfer direction 805, a storage-side data storage memory address 806, and a data size 807 which indicates a data transfer size.

The command completion response 810 includes an entry type 811 indicating a "command completion response", a tag number 812 which associates the command request shown in FIG. 6A and the present command completion response with each other, a port ID 813 of a transmission source, a port ID 814 of a transmission destination, and a status 815 which includes information such as a result regarding whether command processing succeeded or failed.

Figure 8:
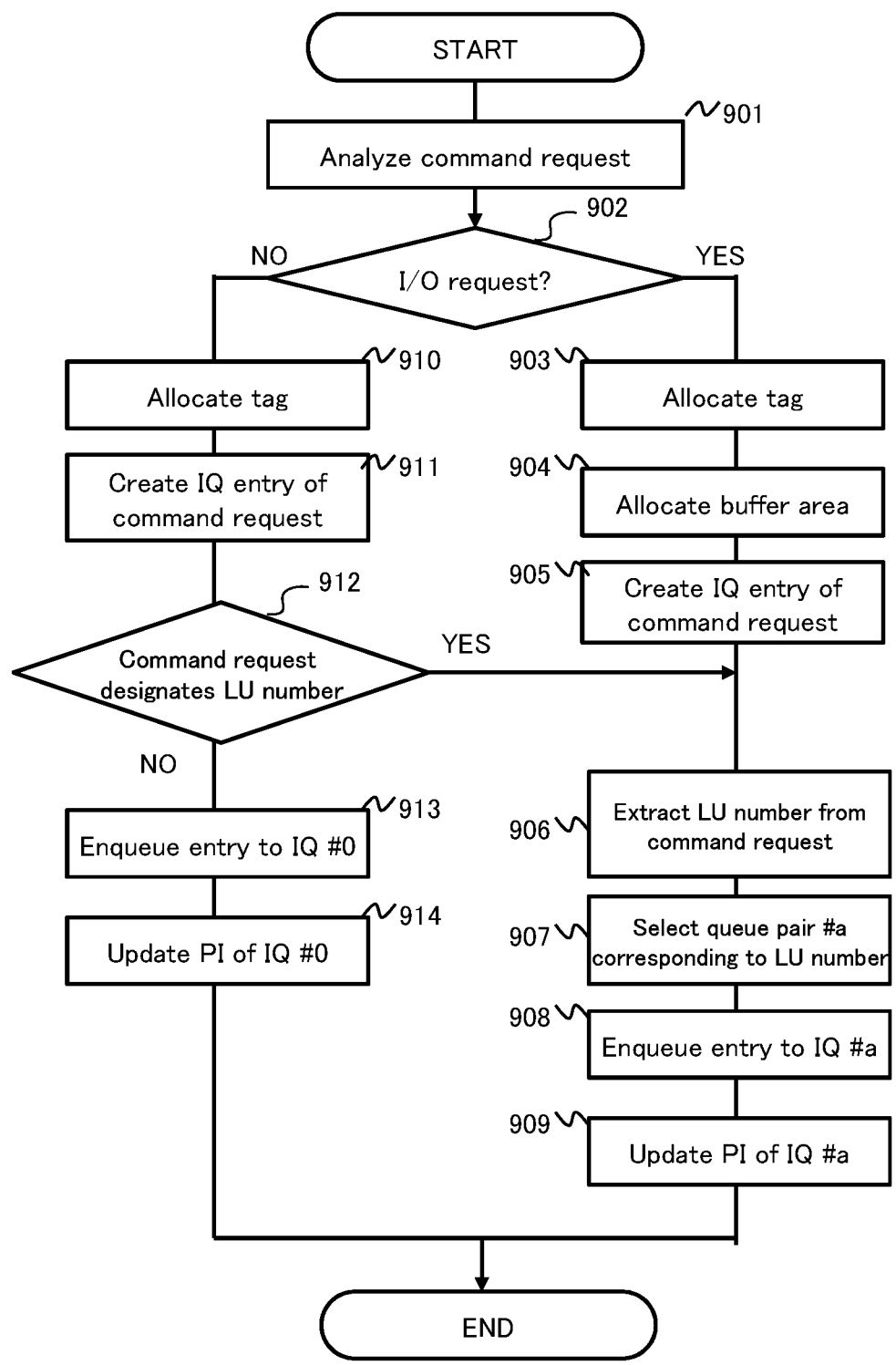
FIG. 8 is a flow chart showing processing by a command request inputting unit 234 according to the first embodiment.

FIG. 8 is a flow chart showing processing by the command request inputting unit 234 according to the first embodiment.

The command request inputting unit 234 first analyzes contents of a command request from the command generating unit 231 (step 901). Since a command request includes a command type, an access destination volume number, an access destination volume address, a data transfer length, and the like, the command request inputting unit 234 acquires these pieces of information.

Next, the command request inputting unit 234 determines whether or not the command request is an I/O request (step 902). When the command request is an I/O request, the command request inputting unit 234 proceeds to step 903, but if not, the command request inputting unit 234 proceeds to step 910.

When the command request is an I/O request, the command request inputting unit 234 allocates a tag number corresponding to the command request and copies contents of the command to an entry in the command management table 238 corresponding to the tag number (step 903). The tag number is an identification number singly allocated to each command being executed and is a unique value among commands being executed.

Next, the command request inputting unit 234 allocates a buffer area for data transfer (step 904). Specifically, for example, the command request inputting unit 234 reserves a buffer area to be used in data transfer of the command and creates a host-side SG (Scatter Gather) list. Next, the command request inputting unit 234 creates an IQ entry corresponding to the contents of the command request in accordance with the entry format of the command request 700 shown in FIG. 6A.

Next, the command request inputting unit 234 extracts an access destination LU number from the command request (step 906). Next, the command request inputting unit 234 refers to the command distribution table 222 and selects a queue pair #a corresponding to a logical volume that is an access destination of the command request. For example, the queue pair #a corresponding to the LU number may be selected. In addition, when there are a plurality of storage ports, a queue pair ID corresponding to a storage port ID and the LU number may be selected.

Next, the command request inputting unit 234 enqueues the created entry to the end of the inbound queue 225 (IQ #a) of the queue pair #a (step 908). Next, the command request inputting unit 234 updates the PI of the IQ #a (step 909), and ends the processing.

On the other hand, when the command request is not an I/O request in step 902, the command request inputting unit 234 allocates a tag number corresponding to the command request (step 910). A command that is not an I/O request is, for example, a management command.

Next, the command request inputting unit 234 creates an entry of an IQ of the command request (step 911). Next, the command request inputting unit 234 determines whether or not an access destination LU number is designated in the command request. When an access destination LU number is designated, the processing advances to step 906, but if not, the processing advances to step 913. When an access destination LU number is not designated, the processing of step 906 and thereafter is the same as described above.

On the other hand, when an access destination LU number is not designated, the command request inputting unit 234 enqueues the created entry to the end of the inbound queue 225 (IQ #0) of a queue pair #0 (step 913). Next, the command request inputting unit 234 updates the PI of the IQ #0 (step 914).

Note that an enqueue destination of the entry in step 913 described above is set to the IQ #0 in order to guarantee an order of management commands by fixing the enqueue destination to one queue. Therefore, the enqueue destination may be a queue other than the IQ #0 as long as the enqueue destination is fixed to one queue.

Moreover, when there is an anomaly in the command type of the command request in step 902 described above, the processing may be configured to end by returning an error (not illustrated).

In addition, a method of enqueuing and a method of updating the PI described above are the same as methods used for a general queue interface. A suffix of the IQ #a denotes an IQ entry indicated by the PI. In addition, updating the PI refers to a process of incrementing the PI. In doing so, when the PI exceeds a maximum value (a queue length of the IQ #a), the PI is restored to 0.

In the present embodiment, as indicated in steps 913 and 914, the command request inputting unit 234 enqueues a command request of a command which does not designate a logical volume to one prescribed queue pair. By gathering commands such as a management command which do not designate a logical volume in one queue in this manner, a processing order can be maintained even with respect to such commands.

Figure 9:
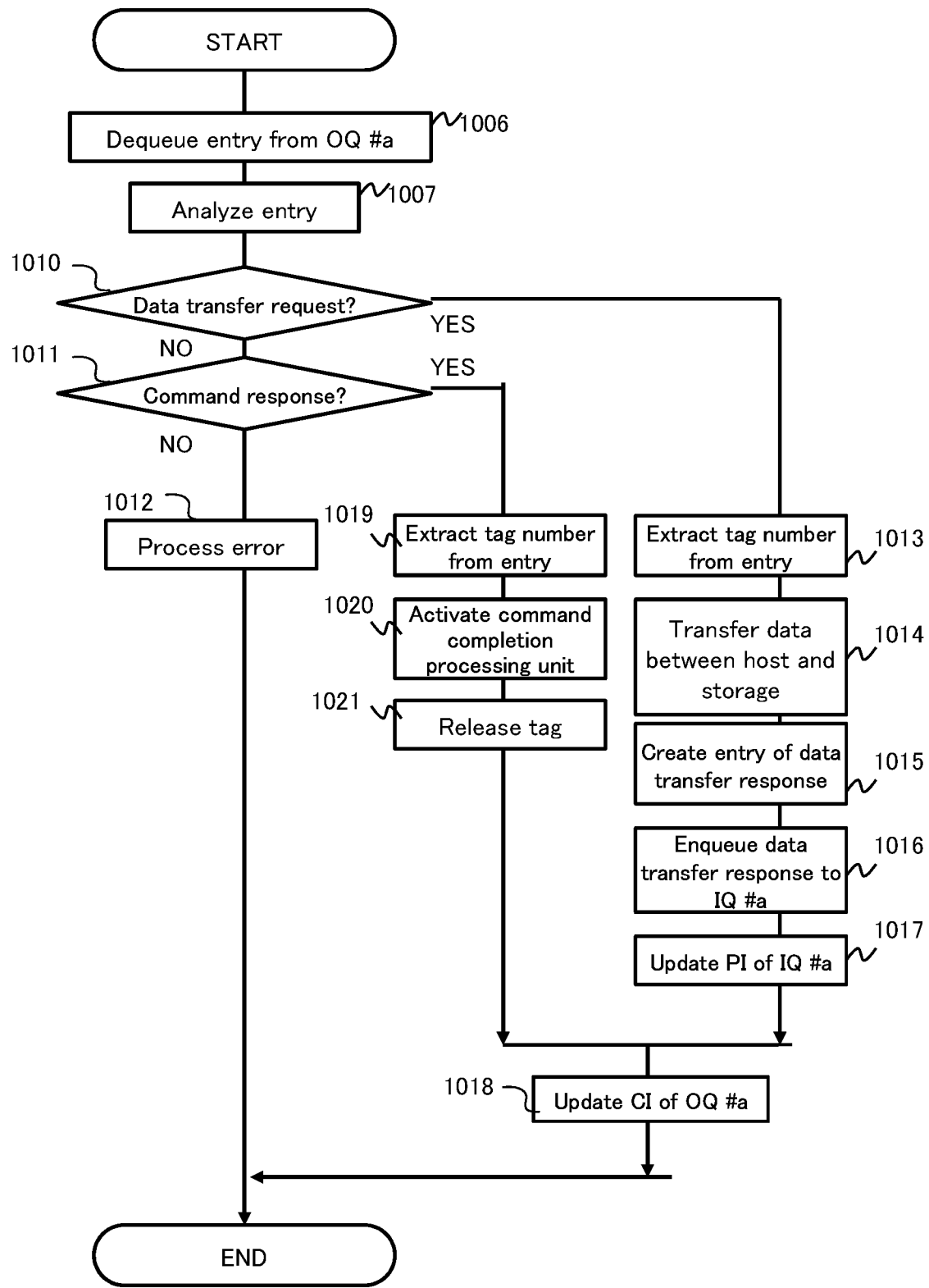
FIG. 9 is a flow chart showing processing by a command response fetching unit 235 according to the first embodiment.

FIG. 9 is a flow chart showing processing by the command response fetching unit 235 according to the first embodiment. In the description of the processing, as an example, it is assumed that the command response fetching unit 235 is in charge of the outbound queue 226 (OQ #a) of the queue pair #a.

The command response fetching unit 235 determines whether or not a new entry is enqueued to the OQ #a by observing a difference between the PI and the CI of the OQ #a.

The flowchart shown in FIG. 9 represents processing of the command response fetching unit 235 when a new entry is enqueued to the outbound queue 226 or, in other words, when an entry to be dequeued exists in the outbound queue 226.

Moreover, when enqueuing a new entry, the storage service program 214 selects the queue pair #a that is an enqueue destination by a method similar to that of steps 906 and 907 described above, enqueues the created entry to the end of the OQ #a, and updates the PI of the OQ #a.

In addition, the processing of the command fetching unit 235 is to be executed in either a polling mode or a system call mode as will be described later.

Referring to FIG. 9, the command response fetching unit 235 first dequeues an entry from the top of the OQ #a (step 1006). Next, the command response fetching unit 235 analyzes the dequeued entry (step 1007). Next, the command response fetching unit 235 determines whether or not contents of the entry represent a data transfer request (step 1010). When the contents of the entry represent a data transfer request, the command response fetching unit 235 proceeds to step 1013, but otherwise the command response fetching unit 235 proceeds to step 1011.

When the contents of the entry represent a data transfer request in step 1010, the command response fetching unit 235 collates the data transfer request with a data transfer request format and extracts a tag number from the data transfer request (step 1013). Next, the command response fetching unit 235 transfers data with a data length designated in the data transfer request in accordance with a data transfer direction designated in the data transfer request between the user program 211 (a host side) and the storage service program 214 (a storage side) via a buffer area corresponding to the tag number and, after the data transfer is completed, releases resources used in the data transfer (step 1014). The resources used in the data transfer are the buffer area used in the data transfer, the host-side SG (Scatter Gather) list, and the like.

Next, based on contents of the data transfer request, the command response fetching unit 235 creates an entry of a data transfer completion response (step 1015). Next, the command response fetching unit 235 enqueues the data transfer completion response to the IQ #a (step 1016). Next, the command response fetching unit 235 updates the PI of the IQ #a so as to reflect the fact that a new entry has been enqueued (step 1017).

Next, the command response fetching unit 235 updates the CI of the OQ #a so as to reflect the fact that an entry has been dequeued (step 1018), and ends the processing.

When the contents of the entry do not represent a data transfer request in step 1010 described above, the command response fetching unit 235 proceeds to step 1011. The command response fetching unit 235 determines whether or not contents of the entry represent a command completion response (step 1011). When the contents of the entry represent a command completion response, the command response fetching unit 235 proceeds to step 1019, but otherwise the command response fetching unit 235 proceeds to step 1012.

When the contents of the entry represent a command completion response in step 1011, the command response fetching unit 235 collates the command completion response with a command completion response format and extracts a tag number (step 1019). Next, the command response fetching unit 235 notifies the command completion processing unit 232 of completion of the command and activates the command completion processing unit 232 (step 1020). Next, the command response fetching unit 235 releases an entry of the command management table 238 corresponding to the tag number extracted from the command completion response, and releases the tag number (step 1021).

Moreover, in addition to utilizing an entry of the command management table 238 and a tag number as in the present embodiment, management information associated with the command may be retained in the communication driver 233. In this case, in step 1021, a resource such as an entry in a table storing the management information may be released together with a tag number.

Next, the command response fetching unit 235 updates the CI of the OQ #a (step 1018) and ends the processing.

When the contents of the entry do not represent a command completion response in step 1011, the command response fetching unit 235 performs error processing (step 1012), and ends the processing.

Moreover, methods of enqueuing and dequeuing and methods of updating the PI and the CI described above are the same as methods used for a general queue interface.

Figure 10:
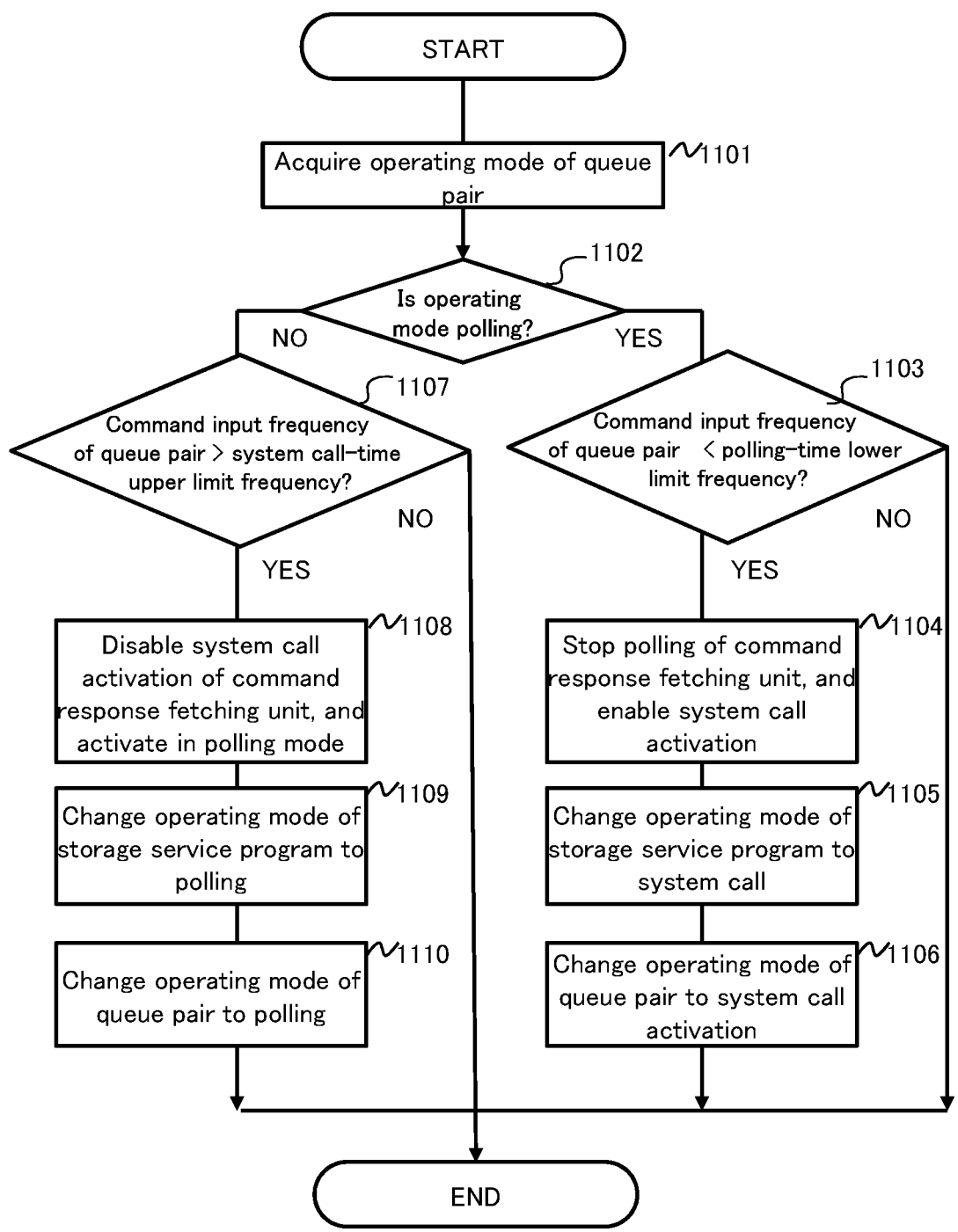
FIG. 10 is a flow chart showing processing by an operating mode changing unit 216 of a queue pair according to the first embodiment.

FIG. 10 is a flow chart showing processing by the operating mode changing unit 216 of a queue pair according to the first embodiment. Although the operating mode changing unit 216 resides inside the communication driver management program 213 and performs processing using the program in the present embodiment, this configuration is not restrictive. As another mode, the operating mode changing unit 216 may reside inside the communication driver 233 and may perform processing using the program.

The operating mode changing unit 216 reduces a CPU load without impairing performance of command processing by the storage apparatus 100 by changing an operating mode to either polling or system call in accordance with a load on a queue pair. When the operating mode is polling, the command response fetching unit 235 regularly or repetitively monitors an OQ and executes a fetching process of the command completion response shown in FIG. 9 when a new entry is enqueued. On the other hand, when the operating mode is system call, the command response fetching unit 235 executes a fetching process of the command completion response upon an enqueue notification from the storage service program 214.

Generally, while a CPU utilization rate increases when the operating mode is polling, command processing with high performance and high efficiency can be performed when a queue load is high. On the other hand, when a queue load is low during polling, since processing for regularly monitoring a queue is executed even when there is no entry, processing efficiency declines. In consideration thereof, by changing the operating mode to system call when the queue load is low and executing processing only when there is an entry, the CPU utilization rate can be reduced and processing efficiency can be improved.

As far as the activation timing of the operating mode changing unit 216 of a queue is concerned, for example, the operating mode changing unit 216 may be activated upon receiving an instruction by a user or the operating mode changing unit 216 may be regularly activated by the communication driver management program 213.

The operating mode changing unit 216 first refers to the queue management table 223 and acquires a current operating mode of a queue pair (step 1101). Next, the operating mode changing unit 216 determines whether or not the operating mode is polling (step 1102). When the operating mode is polling in step 1102, the operating mode changing unit 216 proceeds to step 1103, but otherwise the operating mode changing unit 216 proceeds to step 1107.

When the operating mode is polling in step 1102, the operating mode changing unit 216 compares a command input frequency of the queue pair with a polling-time lower limit frequency (step 1103). When "command input frequency of queue pair<polling-time lower limit frequency", the operating mode changing unit 216 proceeds to step 1104, but otherwise the operating mode changing unit 216 ends the processing.

When "command input frequency of queue pair<polling-time lower limit frequency", the operating mode changing unit 216 stops polling of the command response fetching unit 235 and enables activation by a system call (step 1104). Next, the operating mode changing unit 216 changes the operating mode of the storage service program 214 to system call (step 1105). Next, the operating mode changing unit 216 changes the operating mode of the queue pair in the queue management table 223 to system call (step 1106).

When the operating mode is not polling in step 1102, the operating mode changing unit 216 compares a command input frequency of the queue pair with a system call-time upper limit frequency (step 1107). When "command input frequency of queue pair>system call-time upper limit frequency" in step 1107, the operating mode changing unit 216 proceeds to step 1108, but otherwise the operating mode changing unit 216 ends the processing. When "command input frequency of queue pair>system call-time upper limit frequency", the operating mode changing unit 216 disables activation by a system call of the command response fetching unit 235 and activates the command response fetching unit 235 in the polling mode (step 1108). Next, the operating mode changing unit 216 changes the operating mode of the storage service program 214 to polling (step 1109). Next, the operating mode changing unit 216 changes the operating mode of the queue pair in the queue management table 223 to polling.

In this case, the storage service program 214 does not notify the communication driver 233 of enqueue upon enqueuing when the operating mode is polling, but the storage service program 214 notifies the communication driver 233 of enqueue upon enqueuing when the operating mode is system call.

In the present embodiment, the operating mode changing unit 216 switches the operating mode to system call in a state where polling is being used when a load on a queue (for example, the "command input frequency of a queue pair") is lower than a prescribed polling-time lower limit frequency, and switches the operating mode to polling in a state where system call is being used when a load on a queue exceeds a prescribed system call-time upper limit frequency. Accordingly, since information is promptly fetched by polling when the load on a queue is high and there is a high likelihood that a large amount of information exists in the queue and information is fetched from a queue after using a system call to confirm that information exists when the load on the queue is low and there is uncertainty as to whether information exists in the queue, information can be efficiently fetched by a method suitable for each state of a load on a queue.

In addition, the operating mode changing unit 216 calculates, based on a frequency at which a command completion response is enqueued to a queue, a load on a queue pair including the queue. Accordingly, since a load on a queue pair is to be calculated based on the number of commands to be processed, a processing load on the queue pair can be appropriately calculated.

Figure 11:
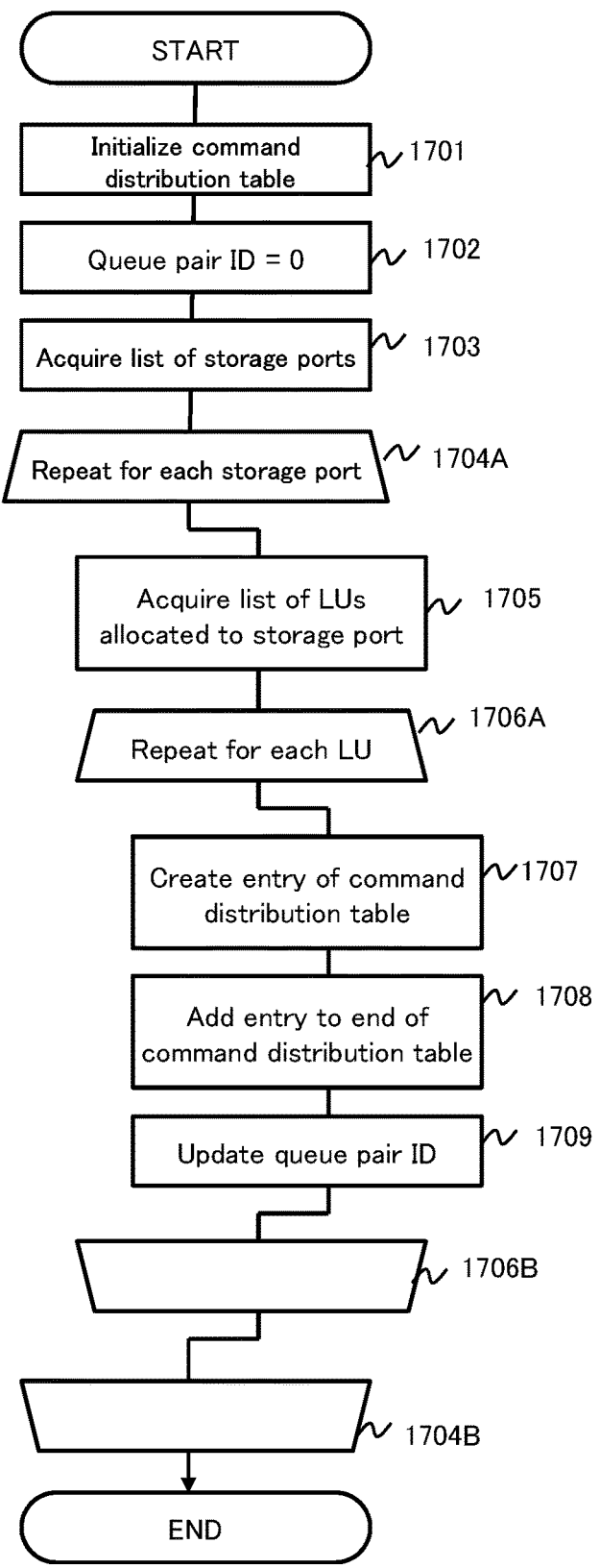
FIG. 11 is a flow chart showing processing by a command distribution table creating unit 217 according to the first embodiment.

FIG. 11 is a flow chart showing processing by the command distribution table creating unit 217 according to the first embodiment. The command distribution table creating unit 217 creates a table entry of the command distribution table 222. Although the command distribution table creating unit 217 resides inside the communication driver management program 213 and performs processing using the program in the present embodiment, this configuration is not restrictive. As another mode, the command distribution table creating unit 217 may reside inside the communication driver 233 and may perform processing using the program.

Referring to FIG. 11, the command distribution table creating unit 217 first initializes the command distribution table 222 (step 1701). Specifically, the command distribution table creating unit 217 reserves a storage destination area of the command distribution table 222 in the shared memory 220 and clears contents of each table entry. Next, the command distribution table creating unit 217 initializes a queue pair ID to 0 (step 1702). Next, the command distribution table creating unit 217 communicates with a management interface of the storage service program 214 and acquires a list of storage ports (step 1703).

Next, the command distribution table creating unit 217 repetitively executes a subroutine 1 with respect to each storage port on the acquired list (steps 1704A and 1704B). In the subroutine 1, the command distribution table creating unit 217 communicates with the management interface of the storage service program 214 and acquires a list of LUs allocated to the storage port (step 1705). At this point, instead of communicating with the management interface of the storage service program 214, a command request for scanning an LU specified by a storage protocol may be input to a storage port to acquire an LU list.

Next, the command distribution table creating unit 217 repetitively executes a subroutine 2 described below with respect to each LU on the acquired list (steps 1706A and 1706B). In the subroutine 2, the command distribution table creating unit 217 creates an entry of the command distribution table 222 from an ID of the storage port, an LU number of the LU, and the queue pair ID (step 1707). Next, the command distribution table creating unit 217 adds the created entry to the command distribution table 222 (step 1708).

Next, the command distribution table creating unit 217 updates the queue pair ID (step 1709). Specifically, the command distribution table creating unit 217 increments the queue pair ID and, when queue pair ID number of queue pairs, sets queue pair ID=0. Moreover, when an LU is newly added, an entry of the command distribution table 222 corresponding to the new LU can be created by performing the processing of steps 1707 to 1709.

Once the subroutine 2 is completed with respect to each LU and the subroutine 1 is completed with respect to each storage port, the command distribution table creating unit 217 completes the processing.

As described above, according to the first embodiment, by providing a plurality of queues and distributing commands to the queues and, at the same time, using a command distribution table including mapping of each logical volume and a queue when selecting a distribution destination queue of a command, communication between a communication driver and a storage service program can be facilitated while guaranteeing an order of command processing and, as a result, performance of a storage apparatus can be improved without causing logical inconsistency. In addition, by suitably changing an operating mode of a queue in accordance with a load, an appropriate storage apparatus with a low CPU load can be realized while satisfying performance requirements such as command processing throughput.

Second Embodiment

In the first embodiment, a basic mode which realizes both improved processing performance and maintenance of a command processing order by providing multiple queues and distributing commands having a same logical volume as access destinations to a same queue pair has been described. In a second embodiment, a mode which further dynamically controls a distribution destination queue pair to which commands are to be distributed and the number of queue pairs to be distribution destinations of commands will be described.

A concentrated load on a queue pair can be balanced by controlling the queue pair so as to distribute a part of commands distributed to the queue pair to other queue pairs. In addition, by dynamically controlling a distribution destination of a command and, at the same time, utilizing the dynamic control of a distribution destination to also dynamically control the number of queue pairs, a load on a processor which controls each queue pair can be reduced while maintaining a load on a queue pair within an appropriate range.

A configuration of a storage apparatus according to the second embodiment is the same as that of the first embodiment shown in FIGS. 1 and 2. In addition, since processing of the second embodiment has much in common with processing of the first embodiment, a description will be given with a focus on differences from the first embodiment.

Figure 12:
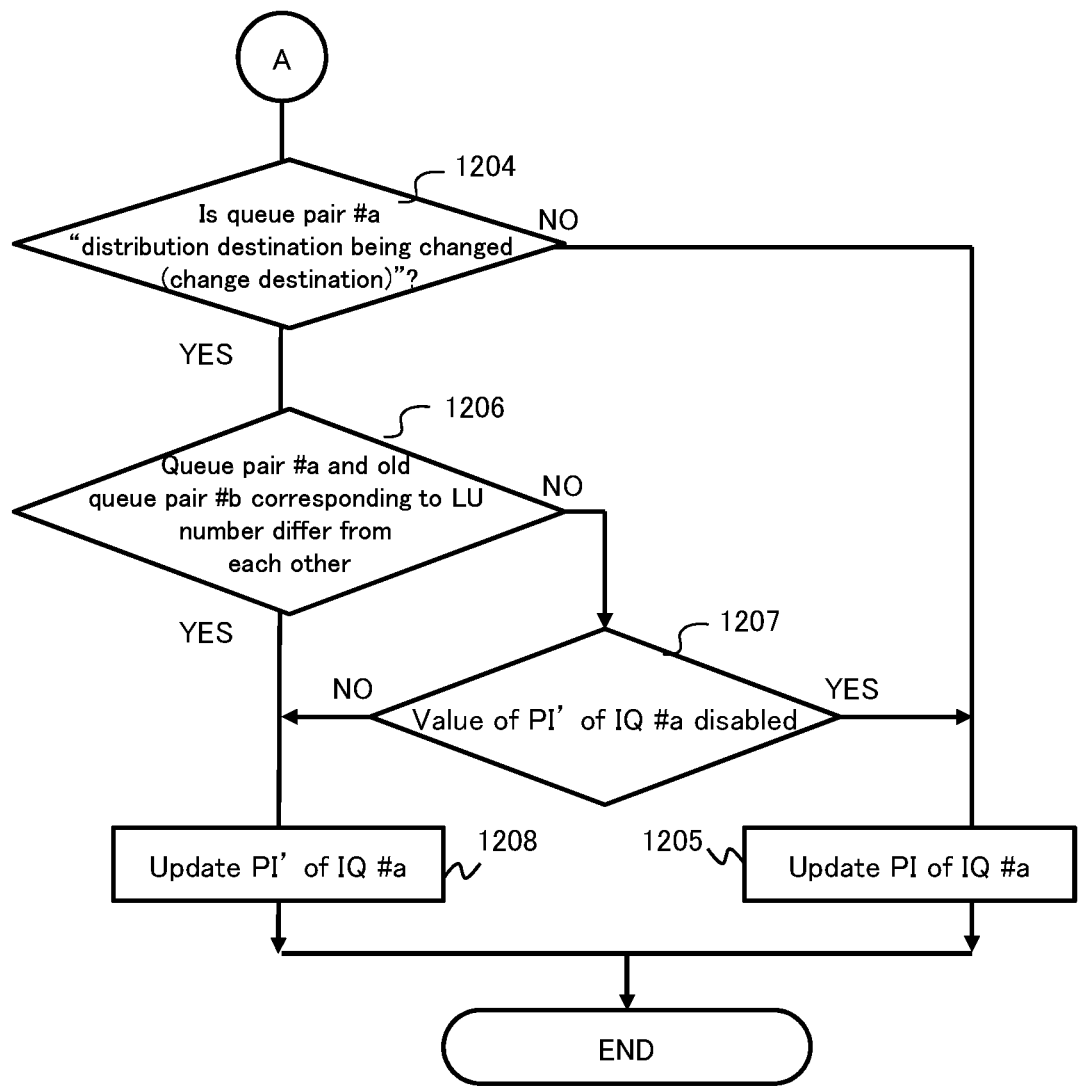
FIG. 12 is a flow chart for describing processing by the command request inputting unit 234 according to a second embodiment.

FIG. 12 is a flow chart for describing processing by the command request inputting unit 234 according to the second embodiment. Here, only differences from the processing flow of the first embodiment shown in FIG. 8 will be described. The command request inputting unit 234 according to the second embodiment executes processing of A and thereafter in FIG. 12 in place of step 909 in FIG. 8. In other words, as a modification, processing in a case where a state of a queue pair is "distribution destination being changed" indicating that a distribution destination of a command is being changed has been added to cases where a command request is an I/O request. Due to this modification, a processing order of commands can be guaranteed even when a distribution destination of a command is dynamically changed.

Hereinafter, the processing of step 1204 and thereafter which has been modified in the second embodiment will be described. Referring to FIG. 12, the command request inputting unit 234 refers to the state 402 corresponding to a queue pair #a in the queue management table 223 and determines whether or not an operating state is "distribution destination being changed (change destination)" (step 1204). When the operating state is "distribution destination being changed (change destination)" in step 1204, the command request inputting unit 234 proceeds to step 1206, but otherwise the command request inputting unit 234 proceeds to step 1205.

When the operating state is not "distribution destination being changed (change destination)" in step 1204, the command request inputting unit 234 updates the PI of the IQ #a (step 1205), and ends the processing. On the other hand, when the operating state is "distribution destination being changed (change destination)" in step 1204, the command request inputting unit 234 determines, from the command request, whether or not a queue pair #a and an old queue pair #b which correspond to an LU number of a logical volume that is an access destination differ from each other (step 1206).

When "the queue pair #a and the old queue pair #b which correspond to the access destination LU number differ from each other" in step 1206, the command request inputting unit 234 proceeds to step 1208, but otherwise the command request inputting unit 234 proceeds to step 1207. When "the queue pair #a and the old queue pair #b which correspond to the access destination LU number do not differ from each other", the command request inputting unit 234 determines whether or not a value of a PI' of the IQ #a is disabled (step 1207). In this case, the PI' is a copied value of the value of the PI at that moment to be temporarily used, and the PI' becomes enabled upon copying the PI but is disabled once necessary processing ends. In this case, the PI' of the IQ #a is a temporary copy of the PI of the IQ #a. When "the value of the PI' of the IQ #a is disabled" in step 1207, the command request inputting unit 234 proceeds to step 1205, but otherwise the command request inputting unit 234 proceeds to step 1208.

When "the value of the PI' of the IQ #a is disabled" in step 1207, the command request inputting unit 234 updates the PI of the IQ #a (step 1205), and ends the processing. On the other hand, when "the value of the PI' of the IQ #a is not disabled" in step 1207, the command request inputting unit 234 updates the PI' of the IQ #a (step 1208), and ends the processing.

In addition, when "the queue pair #a and the old queue pair #b which correspond to the access destination LU number differ from each other" in step 1206, the command request inputting unit 234 updates the PI' of the IQ #a (step 1208), and ends the processing. Moreover, in the second embodiment, the command response fetching unit 235 regularly monitors a state of a queue pair of which the command response fetching unit 235 is in charge and, when the state of the queue pair is "distribution destination being changed (change destination)", the command response fetching unit 235 temporarily stops processing of a queue entry input while the state of the queue pair is being changed until the state of the queue pair returns to "in operation".

Figure 13:
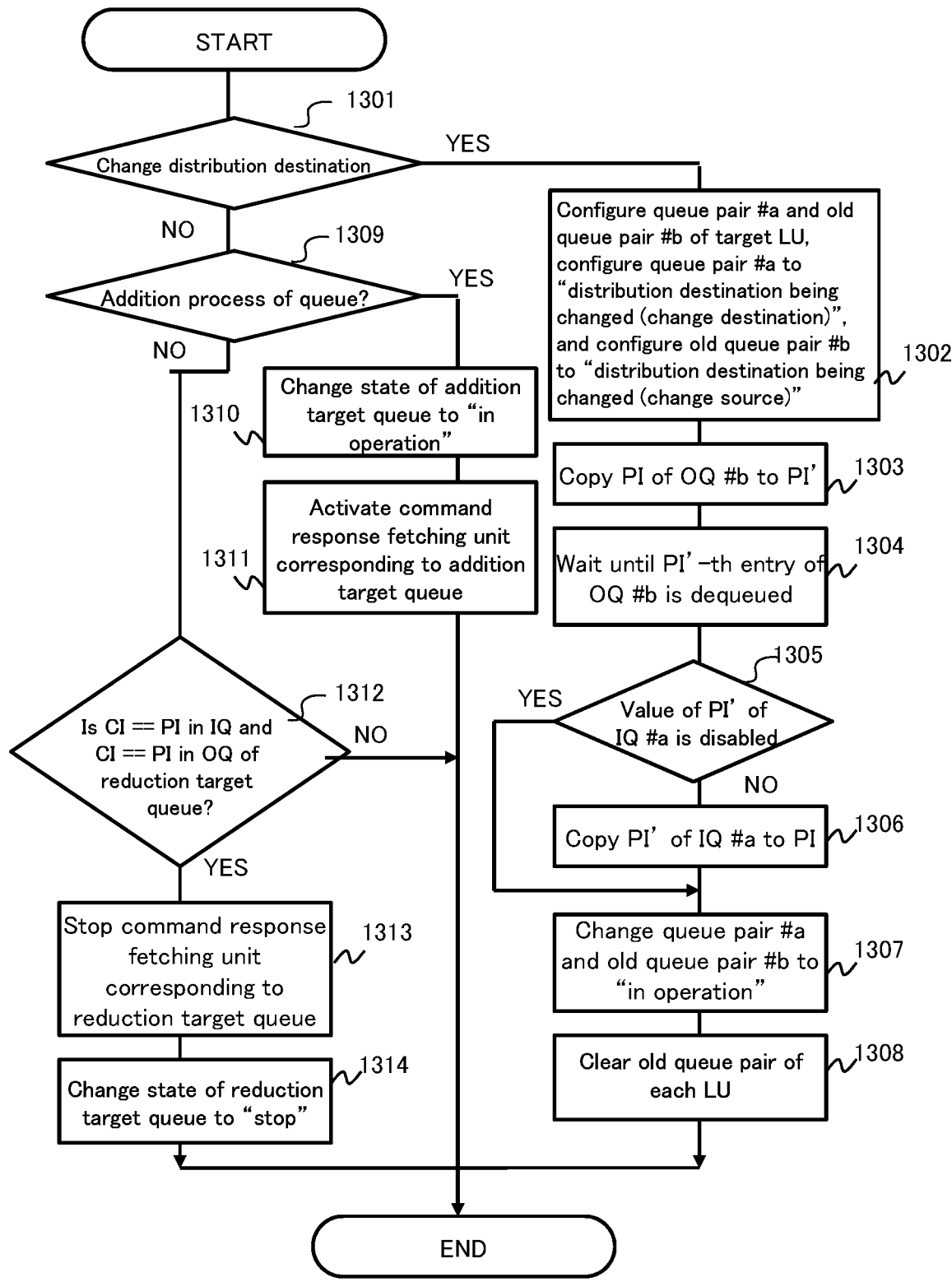
FIG. 13 is a flow chart showing processing by a queue managing unit 237 according to the second embodiment.

FIG. 13 is a flow chart showing processing by the queue managing unit 237 according to the second embodiment. Although the queue managing unit 237 does not run in the first embodiment, the queue managing unit 237 runs in the second embodiment. The queue managing unit 237 resides in the communication driver 233 and performs the respective processing of addition in which the number of queues is increased, reduction in which the number of queues is reduced, and distribution destination change in which a distribution destination of commands is changed.

Referring to FIG. 13, the queue managing unit 237 first determines whether or not contents of a queue configuration change instructed by the communication driver management program 213 represent changing a distribution destination of a queue (step 1301). When the contents of the queue configuration change represent changing a distribution destination of a queue, the queue managing unit 237 proceeds to step 1302, but otherwise the queue managing unit 237 proceeds to step 1309.

When the contents of the change to queue configuration represent changing a distribution destination of a queue in step 1301, with respect to a queue pair #a and an old queue pair #b of the LU in a queue management table 400, the queue managing unit 237 configures the state 402 of the queue pair #a to "distribution destination being changed (change destination)" and configures the state 402 of the old queue pair #b to "distribution destination being changed (change source)" (step 1302). In this case, an old queue pair refers to a distribution destination queue that is a change source (before change) of a command to access the LU, and a queue pair of the LU refers to a distribution destination queue that is a change destination (after change) of the command to access the LU.

The queue pair #a and the old queue pair #b being the same means that there is no change to the distribution destination of a queue with respect to the LU. In the second embodiment, the state 402 of a queue pair in the queue management table includes, in addition to "in operation" which indicates that the queue pair is in operation and "stop" which indicates that the queue pair has been stopped as described in the first embodiment, "distribution destination being changed (change source)" which indicates that the queue pair is a change target queue pair of a distribution destination of a command and a change source queue pair of a distribution destination and "distribution destination being changed (change destination)" which indicates that the queue pair is a change target queue pair of a distribution destination of a command and a change destination queue pair of a distribution destination.

Next, the queue managing unit 237 copies the PI of an OQ #b to the PI' (step 1303). Next, the queue managing unit 237 waits for the command response fetching unit 235 to dequeue a PI'-th entry of the OQ #b (step 1304). When the PI '-th entry of the OQ #b is dequeued, the queue managing unit 237 next determines whether or not a value of the PI' of the IQ #a is disabled (step 1305). When the value of the PI' of the IQ #a is disabled in step 1305, the queue managing unit 237 proceeds to step 1307, but otherwise the queue managing unit 237 proceeds to step 1306. When the value of the PI' of the IQ #a is enabled in step 1305, the queue managing unit 237 copies the PI' of the OQ #a to the PI (step 1306).

Next, the queue managing unit 237 changes the queue pair #a and the old queue pair #b to "in operation" (step 1307). Next, the queue managing unit 237 clears the old queue pair corresponding to each LU (step 1308), and ends the processing.

When the value of the PI' of the IQ #a is disabled in step 1305, since the processing is the same as that of step 1307 and thereafter described above, a description will be omitted.

When the contents of the queue configuration change do not represent changing a distribution destination of a queue in step 1301, the queue managing unit 237 determines whether or not the contents of the queue configuration change represent an addition process of a queue (step 1309). When the contents of the queue configuration change represent an addition process of a queue in step 1309, the queue managing unit 237 proceeds to step 1310, but otherwise the queue managing unit 237 proceeds to step 1312. When the contents of the queue configuration change represent an addition process of a queue in step 1302, the queue managing unit 237 changes the state 402 of a queue pair that is an addition target in the queue management table 223 to "in operation" (step 1310). Next, the queue managing unit 237 activates the command response fetching unit 235 corresponding to the queue that is the addition target (step 1311), and ends the processing.

When the contents of the queue configuration change do not represent an addition process of a queue in step 1309, since the contents of the queue configuration change represent a reduction process of a queue, the queue managing unit 237 determines whether or not an IQ and an OQ of a queue that is a reduction target are empty (step 1312). A queue being empty means that there are no newly input entries in the queue. This is equivalent to the PI and the CI of the queue having equal values. When even one of the IQ and the OQ of the queue that is the reduction target is not empty in step 1312, the queue managing unit 237 ends the processing.

When the IQ and the OQ of the queue that is the reduction target are both empty in step 1312, the queue managing unit 237 stops the command response fetching unit 235 corresponding to the queue that is the reduction target (step 1313). Next, the queue managing unit 237 changes the state 402 of the queue pair that is the reduction target in the queue management table 223 to "stop" (step 1314), and ends the processing.

Figure 14:
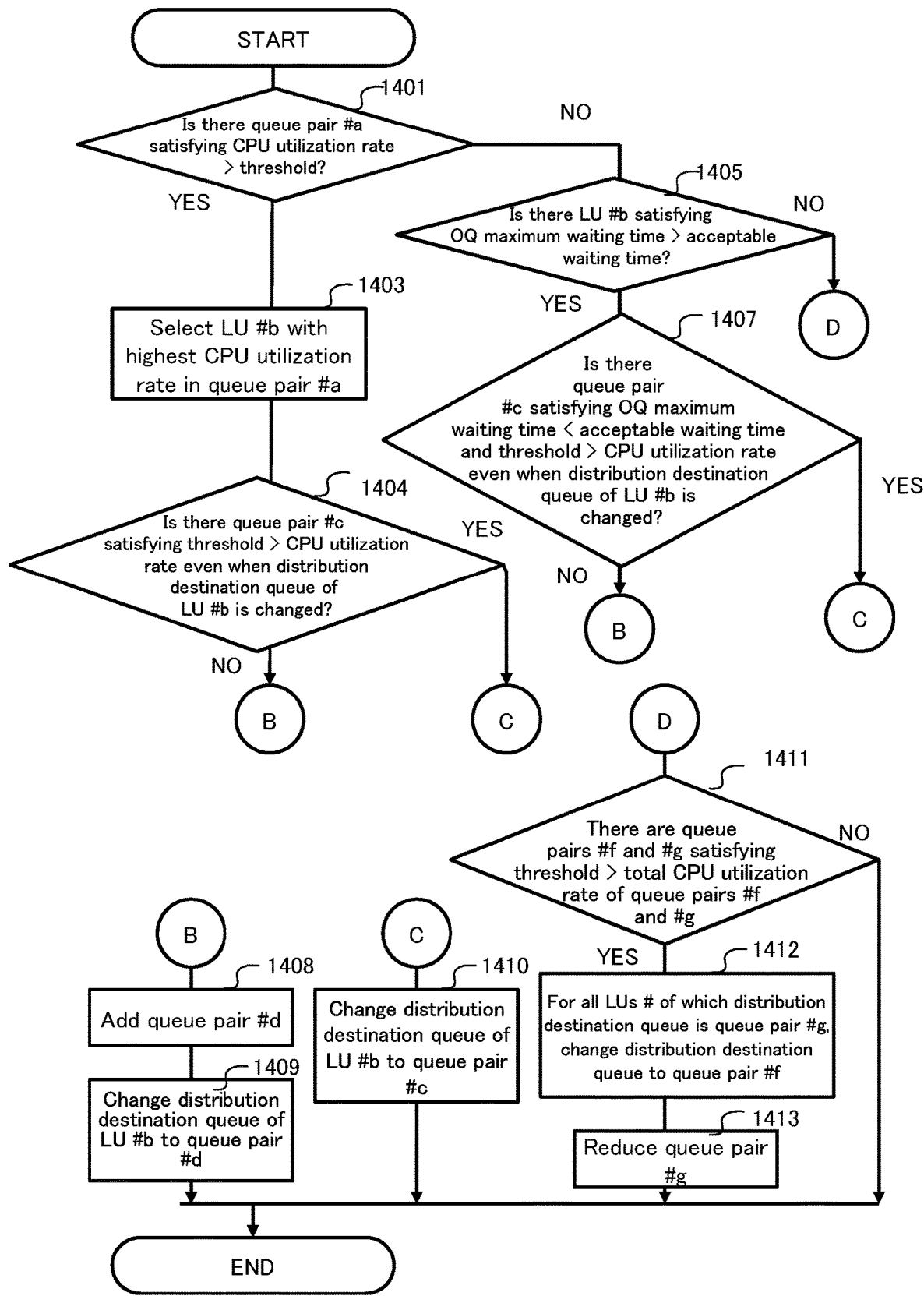
FIG. 14 is a flow chart showing processing by a queue addition/reduction determining unit 218 according to the second embodiment.

FIG. 14 is a flow chart showing processing by a queue addition/reduction determining unit 218 according to the second embodiment.

The queue addition/reduction determining unit 218 determines whether to add or reduce a queue, and when a load on a certain queue pair is high, the queue addition/reduction determining unit 218 improves overall performance by adding a queue pair as necessary and performing load balance on other queue pairs. In addition, when a load on a certain queue pair is low, the queue addition/reduction determining unit 218 reduces usage of CPU resources by changing the queue pair in charge of processing to another queue pair and further stopping a queue pair to which processing is no longer allocated.

Processing up to (B), (C), and (D) in the flow chart shown in FIG. 14 is a portion (a determination portion) in which determinations of an addition of a queue, a change of a distribution destination queue, and a reduction of a queue are made. Processing subsequent to (B), (C), and (D) in the flow chart is a portion (a processing portion) in which processing of an addition of a queue, a change of a distribution destination queue, and a reduction of a queue is performed. A description of the processing flow will be given in two separate portions: the determination portion and the processing portion.

While the queue addition/reduction determining unit 218 resides inside the communication driver management program 213 and performs processing using the program in the present embodiment, as another mode, the queue addition/reduction determining unit 218 may reside inside the communication driver 233 and may perform processing using the program.

First, the determination portion will be described.

The queue addition/reduction determining unit 218 determines whether or not there is a queue pair satisfying a condition expressed as CPU utilization rate>threshold (step 1401). When there is a queue pair #a satisfying the condition expressed as CPU utilization rate>threshold in step 1401, the queue addition/reduction determining unit 218 proceeds to step 1403 but otherwise proceeds to step 1405. Since a load on a queue pair including a queue is calculated based on a CPU utilization rate by the queue, a processing load on a queue can be appropriately measured based on a CPU utilization rate of a processor which performs actual processing.

Moreover, when there are a plurality of queue pairs satisfying the condition described above, one queue pair is selected from the plurality of queue pairs and adopted as the queue pair #a. For example, a queue pair with a highest CPU utilization rate among the queue pairs is selected. When there is a queue pair #a satisfying the condition described above in step 1401, the queue addition/reduction determining unit 218 selects an LU #b with a highest CPU utilization rate in the queue pair #a (step 1403).

Next, the queue addition/reduction determining unit 218 determines whether or not there is a queue pair #c satisfying threshold>CPU utilization rate as a result of changing a distribution destination queue of the LU #b (step 1404). In this case, for example, the CPU utilization rate of the queue pair #c after the distribution destination change is calculated by estimating that the CPU utilization rate of the queue pair #c after the distribution destination change is equal to current CPU utilization rate of queue pair #c+CPU utilization rate of LU #b. Otherwise, the CPU utilization rate of the queue pair #c after the distribution destination change may be calculated by estimating an improvement in the CPU utilization rate due to the distribution destination change from past statistical information or the like.

When there is a queue pair #c satisfying threshold>CPU utilization rate as a result of changing a distribution destination queue of the LU #b in step 1404, the queue addition/reduction determining unit 218 proceeds to step 1410 (C) but otherwise proceeds to step 1408 (B).

When there is no queue pair satisfying the condition described above in step 1401, the queue addition/reduction determining unit 218 determines whether or not there is an LU #b satisfying "OQ maximum waiting time>acceptable waiting time" among the LUs (step 1405). In this case, the acceptable waiting time is information used in determination of queue addition/reduction, details of which will be described later with reference to FIG. 15. When there is an LU #b satisfying the condition described above in step 1405, the queue addition/reduction determining unit 218 proceeds to step 1407 but otherwise proceeds to step 1411 (D). Moreover, when there are a plurality of LUs satisfying the condition described above, one LU is selected from the plurality of LUs and adopted as the LU #b. For example, an LU with a longest OQ maximum waiting time is selected.

When there is an LU #b satisfying the condition described above in step 1405, by changing the distribution destination queue of the LU #b, the queue addition/reduction determining unit 218 determines whether or not there is a queue pair #c satisfying conditions expressed as OQ maximum waiting time<acceptable waiting time and threshold>CPU utilization rate (step 1407). When there is a queue pair #c satisfying the conditions described above in step 1407, the queue addition/reduction determining unit 218 proceeds to step 1410 (C) but otherwise proceeds to step 1408 (B).

Next, the processing portion will be described.

The queue addition/reduction determining unit 218 performs an addition of a queue pair in steps 1408 (B) and 1409. Since there is no existing queue pair of which a load is within an acceptable range even when made a distribution destination of the LU #b, first, the queue addition/reduction determining unit 218 newly adds a queue pair #d (step 1408). Next, the queue addition/reduction determining unit 218 changes a distribution destination queue of the LU #b to the queue pair #d (step 1409), and ends the processing.

In step 1410 (C), the queue addition/reduction determining unit 218 changes distribution of a queue. Since there is an existing queue pair #c of which a load is within the acceptable range even when made a distribution destination of the LU #b, the queue addition/reduction determining unit 218 changes a distribution destination queue of the LU #b to the queue pair #c (step 1410).

The queue addition/reduction determining unit 218 performs a reduction of a queue pair in steps 1411 (D) to 1413. First, the queue addition/reduction determining unit 218 determines whether or not there is a set of a queue pair #f and a queue pair #g satisfying a condition expressed as threshold>(CPU utilization rate of queue pair #f+CPU utilization rate of queue pair #g) (step 1411). When there is a set of the queue pair #f and the queue pair #g satisfying the condition described above in step 1411, the queue addition/reduction determining unit 218 proceeds to step 1412 but otherwise ends the processing.

Moreover, when there are a plurality of sets of the queue pair #f and the queue pair #g satisfying the condition described above in step 1411, one set of the queue pairs is selected from the plurality of sets of the queue pairs and adopted as the queue pair #f and the queue pair #g. For example, a set of queue pairs of which (CPU utilization rate of queue pair #f+CPU utilization rate of queue pair #g) is lowest is adopted as the queue pair #f and the queue pair #g.

When there are the queue pair #f and the queue pair #g satisfying the condition described above in step 1411, the queue addition/reduction determining unit 218 changes a distribution destination queue to the queue pair #f with respect to all LUs #L of which a distribution destination queue is the queue pair #g (step 1412). Next, the queue addition/reduction determining unit 218 reduces the queue pair #g (step 1413), and ends the processing. In this case, reducing a queue pair means stopping and deleting the queue pair. Moreover, while an example in which the queue addition/reduction determining unit 218 uses a CPU utilization rate and an OQ waiting time for addition/reduction determination of a queue has been shown in the description given above, a function expansion such as using another value as a load on a queue may be performed.

FIG. 15 is a diagram showing a queue addition/reduction determination table 227 stored in the processor main memory of the storage apparatus 100 according to the second embodiment.

The queue addition/reduction determination table 227 is a table used for determining addition/reduction of a queue and a change in command distribution for the purpose of realizing high-performance command processing while suppressing processor loads of the storage service program 214 and the communication driver 233.

The queue addition/reduction determination table 227 is a table representing condition information indicating an acceptable range for each logical volume and includes a storage port ID 611, an LU number 612, an OQ acceptable waiting time OQ 613, and an acceptable queue load 614. A logical volume is specified by the storage port ID 611 and the LU number 612. The OQ acceptable waiting time OQ 613 represents an acceptable upper limit value of a waiting time after information is enqueued to the outbound queue 226 until the outbound queue 226 is dequeued. The acceptable queue load 614 represents an acceptable upper limit value of a quantified value of a load on a queue.

Moreover, methods of determining an addition of a queue, a change of a distribution destination, and a reduction of a queue used by the queue addition/reduction determining unit 218 are not limited to the methods shown in FIG. 14. For example, instead of comparing the OQ maximum waiting time with the OQ acceptable waiting time, a quantified value of a load on a queue may be compared with the acceptable queue load 614. In this case, as a quantified value of a load on a queue, for example, the number of logical volumes allocated to the queue may be used.

In addition, in order to avoid a problem in that the coexistence of I/O with a long data transfer length and I/O with a short data transfer length in a same queue causes response performance of the I/O with a short data transfer length to decline, the number of logical volumes of which an average data length is equal to or longer than a designated value among logical volumes allocated to a queue may be adopted as a load of the queue. Otherwise, a value calculated from an access pattern indicated by the average data transfer length 514, the command input frequency 515, or the like of logical volumes may be adopted as a load of a queue.

According to the present embodiment, when a load of a certain queue pair (a first queue pair) exceeds a prescribed threshold (a division threshold), an association destination of at least apart of logical volumes among logical volumes associated with the first queue pair is changed to another existing second queue pair if a load of the second queue pair does not exceed the division threshold even when the logical volumes are associated therewith or to a newly configured third queue pair if there is no other existing second queue pair of which a load does not exceed the division threshold even when the logical volumes are associated therewith. Accordingly, when a load of any of the queue pairs is high, since a distribution destination of a part of the logical volumes associated with the queue pair is changed to another queue pair while minimizing an increase in the number of queue pairs, the load of the queue pair with a high load can be balanced to other queue pairs while suppressing processor load.

In addition, when a load of a certain queue pair (a fourth queue pair) falls below a prescribed reduction threshold, if there is an existing fifth queue pair of which a load does not exceed a dispersion threshold even when all of the logical volumes corresponding to the fourth queue pair in the command distribution table 222 are associated with the fifth queue pair, all of the logical volumes corresponding to the fourth queue pair are configured to the fifth queue pair and the fourth queue pair is deleted. When a load of any of the queue pairs is low, since a distribution destination of logical volumes associated with the queue pair is changed to another existing queue pair and the queue pair with the low load is deleted, the number of queue pairs can be reduced by joining queue pairs with low loads.

As described above, according to the second embodiment, by adding or reducing a queue and changing a distribution destination queue, an appropriate storage apparatus with a low CPU load can be realized while satisfying performance requirements such as command processing throughput and response time in addition to the advantageous effects of the first embodiment.

Third Embodiment

As a third embodiment, an embodiment will be described in which a server that functions as a storage apparatus is provided with an adapter device, the storage apparatus is coupled to a client that is a host computer via the adapter device, and command processing and data transfer are performed between the storage apparatus and the host computer.

An overall configuration of a computer system according to the third embodiment is the same as that of the first embodiment shown in FIG. 1.

Figure 16:
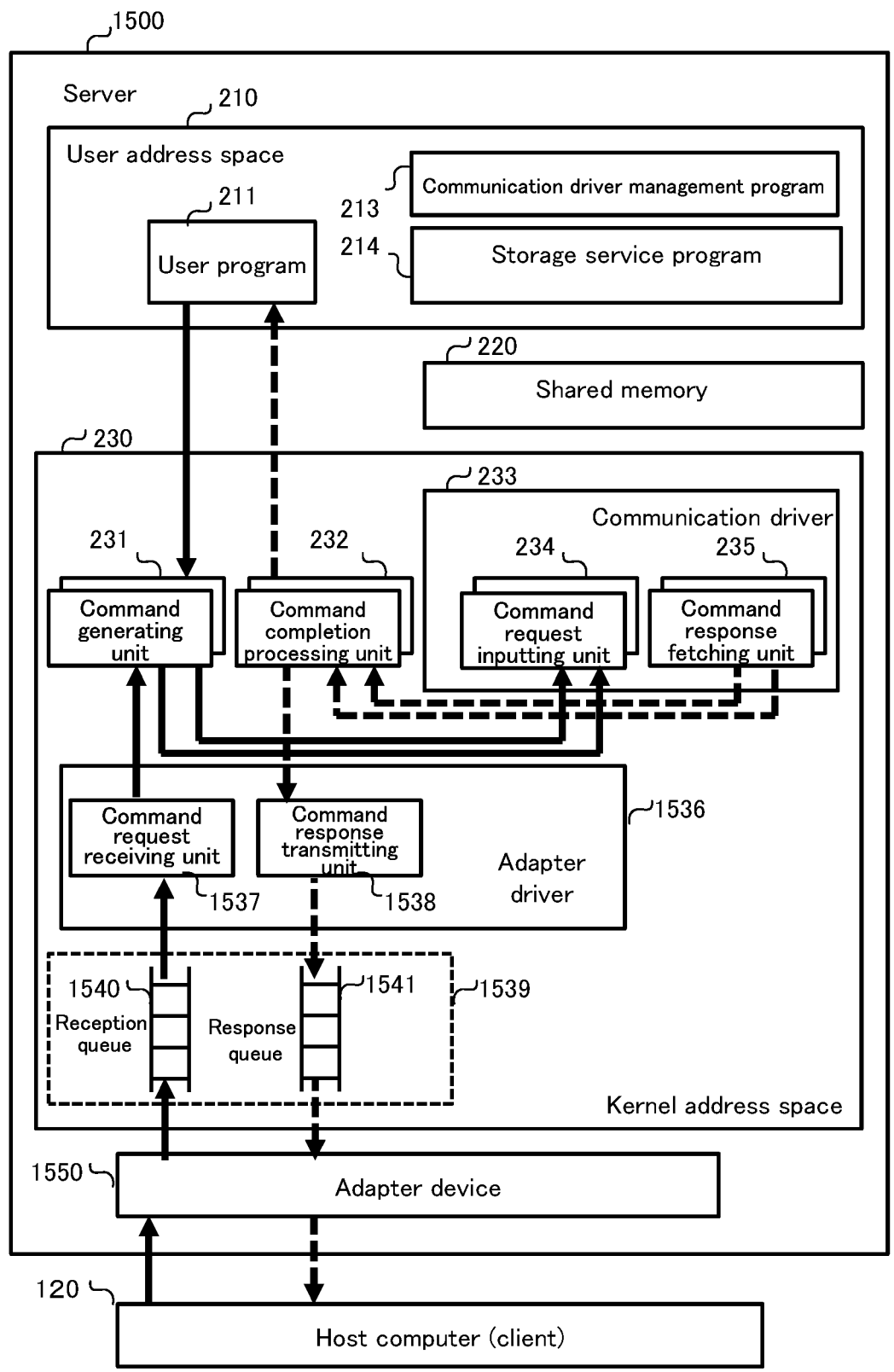
FIG. 16 is a block diagram showing a configuration of a storage apparatus according to a third embodiment.

FIG. 16 is a block diagram showing a configuration of a storage apparatus according to the third embodiment. A configuration of the storage apparatus 100 (a server 1500) according to the third embodiment differs from that of the first embodiment in that an adapter driver 1536 and related portions thereof have been added.

Since the server 1500 of the second embodiment has many similarities with the storage apparatus 100 of the first embodiment shown in FIG. 2, portions similar to FIG. 2 have been simplified in FIG. 16. In addition, in order to prevent the description of the third embodiment from becoming complicated, portions unique to the third embodiment will be mainly described.

An OS running on the server 1500 includes the user address space 210 in which a user program runs and the kernel address space 230 in which a kernel runs. The shared memory 220 is a memory space for performing data communication between the user program 211 and a kernel.

An instance of the user program 211, an instance of the communication driver management program 213, and an instance of the storage service program 214 which provides a storage function run in the user address space 210. The storage service program 214 includes one or more command processing units (not illustrated in FIG. 16) which process storage commands.

The shared memory 220 is a memory area similar to the shared memory 220 of the first embodiment and includes a data buffer, a command distribution table, a queue management table, and one or more queue pairs (not illustrated).

The kernel address space 230 includes: one or more command generating units 231 which generate a command in accordance with an instruction from the user program 211; one or more command completion processing units 232 which notify the user program 211 of a command completion response; the communication driver 233 which communicates with the storage service program 214; an adapter driver 1536; and a hardware queue pair 1539.

In addition to one or more command request inputting units 234 and one or more command response fetching units 235, the communication driver 233 includes a load monitor, a queue managing unit, and a command management table not illustrated in FIG. 16.

Inter-process communication between the storage service program 214 and the communication driver 233 using a queue pair of the shared memory 220 is as described in the first embodiment. In addition, the issuance of a command generation instruction by the user program 211 to the command generating unit 231 and the reception of a notification of a command completion response by the user program 211 from the command completion processing unit 232 are also as described in the first embodiment.

The adapter driver 1536 is driver software for controlling an adapter device 1550. The adapter driver 1536 includes a command request receiving unit 1537 and a command response transmitting unit 1538. The adapter driver 1536 and the adapter device 1550 communicate with each other via the hardware queue pair 1539. The hardware queue pair 1539 includes a reception queue 1540 and a response queue 1541.

The adapter device 1550 is communication hardware for performing data transmission/reception of control data, user data, and the like with other apparatuses. The adapter device 1550 is coupled to the host computer 120 via a network or by a point-to-point link. While only one adapter device 1550 is shown in FIG. 16, there may be a plurality of adapter devices 1550.

A flow of command processing according to the third embodiment is as follows.

First, when the adapter device 1550 receives a command from the host computer 120, the adapter device 1550 creates a queue entry including information on the received command. Next, the adapter device 1550 enqueues the queue entry to the end of the reception queue 1540, updates the PI of the reception queue 1540, and transmits an interrupt signal to the OS.

The OS having received the interrupt signal executes an interrupt handler corresponding to the adapter device 1550 and starts execution of processing of the command request receiving unit 1537 of the adapter driver 1536. Next, the command request receiving unit 1537 dequeues a queue entry from the top of the reception queue 1540, updates the CI of the reception queue, and issues an instruction of command generation to the command generating unit 231 in accordance with contents of the dequeued queue entry.

The command generating unit 231 having received the instruction generates a command in accordance with the instruction. In this case, the command received by the adapter device 1550 and the command generated by the command generating unit 231 are similar in that both include a command type, a volume number, a volume address, and a data transfer length as command contents. However, on the other hand, when communication protocols of the commands differ, formats of the commands as well as information added in correspondence with the respective communication protocols differ.

Subsequently, processing up to the command response fetching unit 235 of the communication driver 233 returning a command completion response to the command completion processing unit 232 is the same as in the first embodiment. In this case, in order to return a command completion response to a transmission source, the command response fetching unit 235 refers to the command management table based on a tag number extracted from the queue entry, identifies an access destination volume number of the command and a port ID of a command transmission source, and returns a command completion response to the command completion processing unit 232 corresponding to the identified volume number and port ID.

In addition, the command completion processing unit 232 returns the command completion response to the adapter driver 1536 having received the command request. Data transfer between the adapter driver 1536 and the adapter device 1550 is performed via a data buffer of the shared memory 220. As a method of data transfer, data may be transferred using a continuous area of the data buffer or data may be transferred using a system such as SG.

In addition, it is assumed that a physical port of the adapter device 1550, a virtual port corresponding to the physical port of the adapter device 1550, and coupling between the virtual port corresponding to the physical port of the adapter device 1550 and a virtual port on a side of the storage service program 214 are configured in advance.

When the command completion processing unit 232 receives the command completion response, the command completion processing unit 232 instructs the command response transmitting unit 1538 to transmit the command completion response. Next, the command response transmitting unit 1538 creates a queue entry including information of the received command completion response. Next, the command response transmitting unit 1538 enqueues the queue entry to the end of the response queue 1541 and updates the PI of the response queue 1541.

Upon the update of the PI of the response queue 1541, the adapter device 1550 dequeues a queue entry from the top of the response queue 1541, updates the CI of the response queue 1541, and transmits the command completion response to the host computer 120 in accordance with contents of the queue entry. As an example, enqueuing, dequeuing, and updating the PI and the CI described above are performed in accordance with a general queue interface.

The storage apparatus 100 according to the third embodiment is configured as described above.

The storage apparatus 100 according to the third embodiment is also capable of executing processing related to the communication driver 233 described in the first and second embodiments. In the third embodiment, the command generating unit 231 and the command completion processing unit 232 correspond to processing units in a SCSI upper layer (or a Block layer) in an OS. In addition, the adapter driver 1536 corresponds to a driver in a SCSI lower layer. In the third embodiment, since the communication driver 233 is configured to be coupled to the adapter driver 1536 with the command generating unit 231 and the command completion processing unit 232 as interfaces, an advantage is gained in that a difference in control arising from a type of the adapter device 1550 is absorbed by the adapter driver 1536 and the communication driver 233 can be implemented regardless of the type of the adapter device 1550.

As described above, according to the third embodiment, in an apparatus configuration in which the storage apparatus 100 and the host computer 120 perform command processing and data transfer via the adapter device 1550, communication between the communication driver 233 and the storage service program 214 can be facilitated while guaranteeing an order of commands to be processed and, as a result, performance of the storage apparatus 100 can be improved without creating logical inconsistencies.

In addition, by changing operating modes of a queue, an appropriate storage apparatus with a low CPU load can be realized while satisfying performance requirements such as command processing throughput.

Furthermore, in the apparatus configuration described above, by adding or reducing a queue and changing a distribution destination queue, an appropriate storage apparatus 100 with a low CPU load can be realized while satisfying performance requirements such as command processing throughput and response time in addition to the advantageous effects of the first embodiment.

In addition, since an implementation of the communication driver 233 need no longer be dependent on the type of the adapter device 1550, the communication driver 233 can be readily implemented.

Fourth Embodiment

In a fourth embodiment, a server that functions as a storage apparatus is provided with an adapter device, the storage apparatus is coupled to a client that is a host computer via the adapter device, and command processing and data transfer are performed between the storage apparatus and the host computer in a similar manner to the third embodiment. A difference of the fourth embodiment from the third embodiment is that a communication driver includes a function of an adapter driver for communicating with an adapter device.

An overall configuration of a computer system according to the fourth embodiment is the same as that of the first embodiment shown in FIG. 1. A configuration of the storage apparatus 100 (a server 1600) according to the fourth embodiment differs from that of the third embodiment in that the communication driver 233 directly controls the adapter device 1550.

Figure 17:
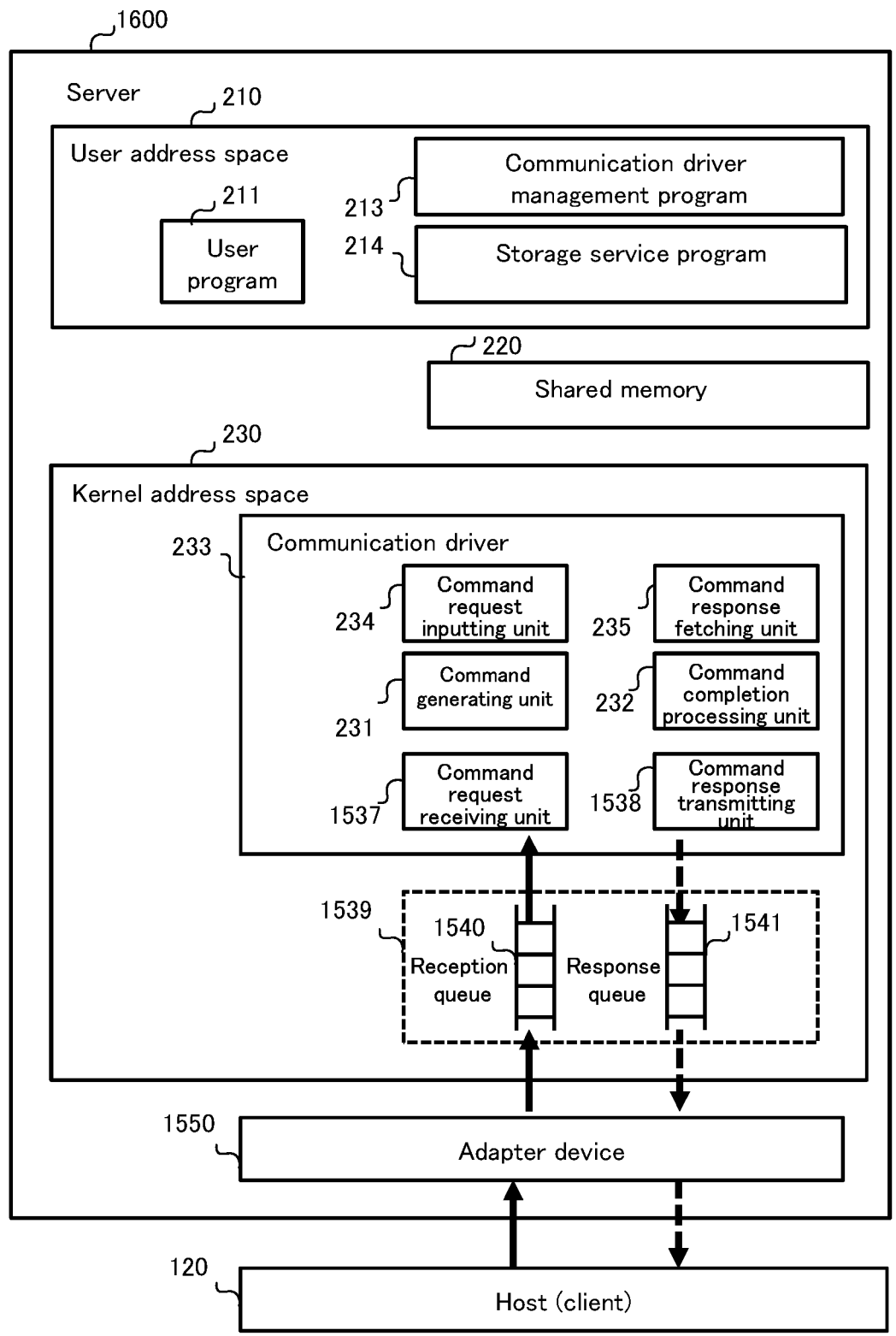
FIG. 17 is a block diagram showing a configuration of a storage apparatus according to a fourth embodiment.

FIG. 17 is a block diagram showing a configuration of a storage apparatus according to the fourth embodiment. Since the configuration of the storage apparatus 100 (the server 1600) according to the fourth embodiment has many similarities with that of the first embodiment shown in FIG. 2, portions similar to FIG. 2 have been simplified in FIG. 17. In addition, in order to prevent the description of the fourth embodiment from becoming complicated, portions unique to the fourth embodiment will be mainly described.

An OS running on the server 1600 includes the user address space 210 in which a user program runs and the kernel address space 230 in which a kernel runs. The shared memory 220 is a memory space for performing data communication between the user program 211 and a kernel.

An instance of the user program 211, an instance of the communication driver management program 213, and an instance of the storage service program 214 which provides a storage function run in the user address space 210. The storage service program 214 includes one or more command processing units (not illustrated in FIG. 17) which process storage commands.

The shared memory 220 is a memory area similar to the shared memory of to the first embodiment and includes a data buffer, a command distribution table, a queue management table, and one or more queue pairs (not illustrated).

The communication driver 233 which communicates with the storage service program 214 and the hardware queue pair 1539 are provided in the kernel address space 230.

In addition to the command request inputting unit 234, the command generating unit 231, the command request receiving unit 1537, the command response fetching unit 235, the command completion processing unit 232, and the command response transmitting unit 1538, the communication driver 233 includes a load monitor, a queue managing unit, and a command management table not illustrated in FIG. 17. In the present embodiment, a communication driver 1633 controls the adapter device 1550 in place of the adapter driver 1536 according to the third embodiment. The hardware queue pair 1539 includes the reception queue 1540 and the response queue 1541.

Inter-process communication between the storage service program 214 and the communication driver 233 using a queue pair of the shared memory 220 is as described in the first embodiment.

The adapter device 1550 is communication hardware for performing data transmission/reception of control data, user data, and the like with other apparatuses. The adapter device 1550 is coupled to the host computer 120 via a network or by a point-to-point link. While only one adapter device 1550 is shown in FIG. 17, there may be a plurality of adapter devices 1550.

A flow of command processing according to the fourth embodiment is as follows.

First, when the adapter device 1550 receives a command from the host computer 120, the adapter device 1550 creates a queue entry including information on the received command. Next, the adapter device 1550 enqueues the queue entry to the end of the reception queue 1540, updates the PI of the reception queue 1540, and transmits an interrupt signal to the OS.

The OS having received the interrupt signal executes an interrupt handler corresponding to the adapter device 1550 and starts execution of processing of the command request receiving unit 1537 of the communication driver 233. Next, the command request receiving unit 1537 dequeues a queue entry from the top of the reception queue 1540, updates the CI of the reception queue, and issues an instruction of command generation to the command generating unit 231 in accordance with contents of the dequeued queue entry.

The command generating unit 231 having received the instruction generates a command in accordance with the instruction. In this case, the command received by the adapter device 1550 and the command generated by the command generating unit 231 are similar in that both include a command type, a volume number, a volume address, and a data transfer length as command contents. However, on the other hand, when communication protocols of the commands differ, formats of the commands as well as information added in correspondence with the respective communication protocols differ.

Subsequently, processing up to the command response fetching unit 235 of the communication driver 233 returning a command completion response to the command completion processing unit 232 is the same as in the first embodiment. In this case, in order to return a command completion response to a transmission source, the command response fetching unit 235 refers to the command management table based on a tag number extracted from the queue entry, identifies an access destination volume number of the command and a port ID of a command transmission source, and returns a command completion response to the command completion processing unit 232 corresponding to the identified volume number and port ID.

Data transfer between the command request receiving unit 1537 and the command response transmitting unit 1538, and the adapter device 1550, is performed via a data buffer of the shared memory 220. As a method of data transfer, data may be transferred using a continuous area of the data buffer or data may be transferred using a system such as SG.

In addition, it is assumed that a physical port of the adapter device 1550, a virtual port corresponding to the physical port of the adapter device 1550, and coupling between the virtual port corresponding to the physical port of the adapter device 1550 and a virtual port on a side of the storage service program 214 are configured in advance.

When the command completion processing unit 232 receives the command completion response, the command completion processing unit 232 instructs the command response transmitting unit 1538 to transmit the command completion response. Next, the command response transmitting unit 1538 creates a queue entry including information of the received command completion response. Next, the command response transmitting unit 1538 enqueues the queue entry to the end of the response queue 1541 and updates the PI of the response queue 1541.

Upon the update of the PI of the response queue 1541, the adapter device 1550 dequeues a queue entry from the top of the response queue 1541, updates the CI of the response queue 1541, and transmits the command completion response to the host computer 120 in accordance with contents of the queue entry. As an example, enqueuing, dequeuing, and updating the PI and the CI described above are performed in accordance with a general queue interface.

The storage apparatus 100 according to the fourth embodiment is configured as described above.

In the configuration of the storage apparatus 100 according to the fourth embodiment, processing related to the communication driver 233 described in the first and second embodiments can be performed.

As described above, according to the fourth embodiment, in a configuration in which the storage apparatus 100 and the host computer 120 perform command processing and data transfer via the adapter device 1550 and the communication driver 233 directly controls the adapter device 1550, communication between the communication driver 233 and the storage service program 214 can be facilitated while guaranteeing an order of commands to be processed and, as a result, performance of the storage apparatus 100 can be improved without creating logical inconsistencies.

In addition, by changing operating modes of a queue, an appropriate storage apparatus with a low CPU load can be realized while satisfying performance requirements such as command processing throughput.

Furthermore, in the apparatus configuration described above, by adding or reducing a queue and changing a distribution destination queue, an appropriate storage apparatus with a low CPU load can be realized while satisfying performance requirements such as command processing throughput and response time in addition to the advantageous effects of the first embodiment.

In addition, since control of the adapter device 1550 and communication with the storage service program 214 are performed in the communication driver 233, high-performance implementation can be realized.

It is to be understood that the embodiments described above merely represent examples for illustrating the present invention and that the scope of the present invention is not limited to the embodiments. It will be obvious to those skilled in the art that the present invention can be implemented in various other modes without departing from the spirit of the present invention.

REFERENCE SIGNS LIST

100 Storage apparatus
101 Processor
103 Memory
104 Switch
105 Frontend interface
106 Drive controller
107A Signal line
107B Signal line
107C Signal line
108 Drive
109 Signal line
111 Signal line
112 Signal line
113 Network
120 Host computer
130 Management terminal
140 Processor
1500 Server
1536 Adapter driver
1537 Command request receiving unit
1538 Command response transmitting unit
1539 Hardware queue pair
1540 Reception queue
1541 Response queue
1550 Adapter device
1600 Server
1633 Communication driver
1640 Reception queue
1641 Response queue
210 User address space
211 User program
213 Storage service program
213 Communication driver management program
214 Storage service program
215 Command processing unit
216 Operating mode changing unit
217 Table creating unit
218 Queue addition/reduction determining unit
220 Shared memory
221 Data buffer
222 Command distribution table
223 Queue management table
224 Queue pair
225 Inbound queue
226 Outbound queue
227 Queue addition/reduction determination table
230 Kernel address space
231 Command generating unit
232 Command completion processing unit
233 Communication driver
234 Command request inputting unit
235 Command response fetching unit
236 Load monitor
237 Queue managing unit
238 Command management table
300 Memory

The invention claimed is:

1. A computer, comprising:
a storage apparatus configured to writably and readably store data;
a memory configured to store a communication driver that is a software program configured to run in an operating system and communicate with a host; and a storage service program that is a software program configured to run on the operating system and control retention of data by the storage apparatus; and
a processor configured to execute the software programs, wherein
the processor is configured to execute the communication driver and the storage service program and configure a plurality of queue pairs including a queue in each of both directions which transmits information in inter-process communication between the communication driver and the storage service program, and the processor is further configured to: configure command distribution information which associates the queue pairs logical volumes with each other; specify a first queue pair corresponding to a first logical volume that is an access destination of a command requested by the host by referring to the command distribution information; and enqueue a command request of the command to the specified first queue pair, and the command distribution information is created by acquiring a port and a logical unit number (LUN) for each queue pair and associating the port and the logical unit with the queue pair, wherein each logical volume is defined by the pair of the port and the logical unit.

2. The computer according to claim 1, wherein the processor is configured to enqueue a command request of a command, which does not designate a logical volume, to one prescribed queue pair.

3. The computer according to claim 1, wherein
the memory is configured to further store an adapter driver which is a software program for communicating with an adapter device to be coupled with an external host, and
the processor is configured to further execute the adapter driver, receive a command request from the host via the adapter device, and transmit a command completion response corresponding to the command request to the host via the adapter device.

4. The computer according to claim 1, wherein
the communication driver is a software program configured to further receive a command request from the host via an adapter device to be coupled with an external host and transmit a command completion response corresponding to the command request to the host via the adapter device.

5. A computer, comprising:
a storage apparatus configured to writably and readably store data;
a memory configured to store a communication driver that is a software program configured to run in an operating system and communicate with a host; and a storage service program that is a software program configured to run on the operating system and control retention of data by the storage apparatus; and
a processor configured to execute the software programs, wherein
the processor is configured to execute the communication driver and the storage service program and configure a plurality of queue pairs including a queue in each of both directions which transmits information in inter-process communication between the communication driver and the storage service program, and the processor is further configured to: configure command distribution information which associates the queue pairs logical volumes with each other; specify a first queue pair corresponding to a first logical volume that is an access destination of a command requested by the host by referring to the command distribution information; and enqueue a command request of the command to the specified first queue pair, wherein
the memory is configured to further store a communication driver management program that is a software program which runs on the operating system and which manages the communication driver,
timings, at which the communication driver fetches information from a queue which transfers information forwarded to the communication driver from the storage service program, are used in implementing a system call from the storage service program to the communication driver and polling by the communication driver, and the processor is configured to further execute the communication driver management program, switch to the system call in a state where the polling is being used when a load of the queue falls below a prescribed polling-time lower limit frequency, and switch to the polling in a state where the system call is being used when a load of the queue exceeds a prescribed system call-time upper limit frequency.

6. The computer according to claim 5, wherein
the processor is configured to calculate, based on a frequency at which a command completion response is enqueued to the queue, a load on a queue pair including the queue.

7. A computer, comprising:
a storage apparatus configured to writably and readably store data;
a memory configured to store a communication driver that is a software program configured to run in an operating system and communicate with a host; and a storage service program that is a software program configured to run on the operating system and control retention of data by the storage apparatus; and
a processor configured to execute the software programs, wherein
the processor is configured to execute the communication driver and the storage service program and configure a plurality of queue pairs including a queue in each of both directions which transmits information in inter-process communication between the communication driver and the storage service program, and the processor is further configured to: configure command distribution information which associates the queue pairs logical volumes with each other; specify a first queue pair corresponding to a first logical volume that is an access destination of a command requested by the host by referring to the command distribution information; and enqueue a command request of the command to the specified first queue pair, wherein
the processor is configured to change, in the command distribution information, when a load of a first queue pair exceeds a prescribed dispersion threshold, an association destination of at least a part of logical volumes among logical volumes associated with the first queue pair to, when available, another existing second queue pair when a load of the second queue pair does not exceed the balance threshold even when the logical volumes are associated therewith or to a newly configured third queue pair when there is no other existing second queue pair of which a load does not exceed the dispersion threshold even when the logical volumes are associated therewith.

8. The computer according to claim 7, wherein
the processor is configured to calculate a load on a queue pair including the queue, based on a CPU utilization rate by the queue.

9. The computer according to claim 7, wherein
the processor is configured to in the command distribution information, when a load of a fourth queue pair falls below a prescribed reduction threshold, when an existing fifth queue pair of which a load does not exceed the balance threshold is available even when all of the logical volumes corresponding to the fourth queue pair in the command distribution information are associated with the fifth queue pair, configure all of the logical volumes corresponding to the fourth queue pair to the fifth queue pair and delete the fourth queue pair.

10. A computer, comprising:
a storage apparatus configured to writably and readably store data;
a memory configured to store a communication driver that is a software program configured to run in an operating system and communicate with a host; and a storage service program that is a software program configured to run on the operating system and control retention of data by the storage apparatus; and
a processor configured to execute the software programs, wherein
the processor is configured to execute the communication driver and the storage service program and configure a plurality of queue pairs including a queue in each of both directions which transmits information in inter-process communication between the communication driver and the storage service program, and the processor is further configured to: configure command distribution information which associates the queue pairs logical volumes with each other; specify a first queue pair corresponding to a first logical volume that is an access destination of a command requested by the host by referring to the command distribution information; and enqueue a command request of the command to the specified first queue pair, wherein
the queue pair is configured to include an inbound queue from the communication driver toward the storage service program and an outbound queue from the storage service program toward the communication driver, and
the processor is configured to:
using the communication driver, analyze a command requested from the host and determine whether or not the command is a command of an I/O request, when the command is not a command of an I/O request, further determine whether or not the command includes a designation of a logical volume, when there is no designation of a logical volume, enqueue an entry of the command to an inbound queue of a single queue pair determined in advance, when the command is a command of an I/O request or when the command includes a designation of a logical volume, specify a logical volume designated in the command, specify a queue pair corresponding to the logical volume based on the command distribution information, and enqueue a command request of the command to an inbound queue of the queue pair;

using the storage service program, dequeue the command request from the inbound queue, process the command of the command request, specify the queue pair corresponding to the logical volume that is an access destination of the command based on the command distribution information, and enqueue a command completion response of the command to an outbound queue of the queue pair; and using the communication driver, dequeue information from the outbound queue at any of timings, at which information is fetched from the outbound queue, including a first timing that is a system call from the storage service program to the communication driver and a second timing that is polling by the communication driver, when the information is a data transfer request that requests data transfer between the host and the storage service program, perform data transfer based on the data transfer request, and when the information is the command completion response, return the command completion response to the host.

11. A communication control method for communicating with a host, the communication control method being executed by a computer including a storage apparatus which writably and readably stores data, a memory which stores a software program a communication driver that is a software program configured to run in an operating system and communicate with a host; and a storage service program that is a software program configured to run on the operating system and control retention of data by the storage apparatus, and a processor which executes the software programs, the method comprising the steps of:
configuring a plurality of queue pairs including a queue in each of both directions which retains and transmits information in inter-process communication with the storage service program,
configuring command distribution information which associates the queue pairs and logical volumes with each other, the command distribution information being created by acquiring a port and a logical unit number (LUN) for each queue pair and associating the port and the logical unit with the queue pair, wherein each logical volume is defined by the pair of the port and the logical unit;
specifying a first queue pair corresponding to a first logical volume that is an access destination of a command requested by the host by referring to the command distribution information; and
enqueuing a command request of the command to the specified queue pair.

* * * * *